(12) United States Patent
Tanimoto

(10) Patent No.: US 10,097,751 B2
(45) Date of Patent: Oct. 9, 2018

(54) IMAGING APPARATUS AND IMAGE COMPOSITING METHOD

(71) Applicant: Olympus Corporation, Hachioji-shi, Tokyo (JP)

(72) Inventor: Tetsushi Tanimoto, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/621,043

(22) Filed: Jun. 13, 2017

(65) Prior Publication Data
US 2018/0020149 A1    Jan. 18, 2018

(30) Foreign Application Priority Data
Jul. 15, 2016   (JP) .................. 2016-140531

(51) Int. Cl.
*H04N 5/232*  (2006.01)
*H04N 5/235*  (2006.01)
*G03B 13/36*  (2006.01)

(52) U.S. Cl.
CPC ......... *H04N 5/23212* (2013.01); *G03B 13/36* (2013.01); *H04N 5/2356* (2013.01); *H04N 5/23232* (2013.01)

(58) Field of Classification Search
None
See application file for complete search history.

(56) References Cited

U.S. PATENT DOCUMENTS

2015/0153559 A1*  6/2015  Sato .................... G02B 21/367
                                                    348/79

FOREIGN PATENT DOCUMENTS

| JP | 2001-298755 | 10/2001 |
|----|-------------|---------|
| JP | 2015-186088 | 10/2015 |

* cited by examiner

*Primary Examiner* — Mark T Monk
(74) *Attorney, Agent, or Firm* — John C. Pokotylo; Pokotylo Patent Services

(57) ABSTRACT

An imaging apparatus carries out imaging at a plurality of focus positions that have been set, and carries out successive image combination for each imaging, generates a focus stacked image after imaging a plurality of times imaging is to be performed that has been set by a focus bracket setting section, and performs image combination of an image that has been taken at the final focus position with a previously taken image or a previously combined image, with position of the finally taken image as a reference for alignment at the time of image combination, and on the other hand performs image combination of taken images other than an image that has been taken at the final focus position with a previously taken image or an image that was previously combined, as the reference for alignment.

11 Claims, 19 Drawing Sheets

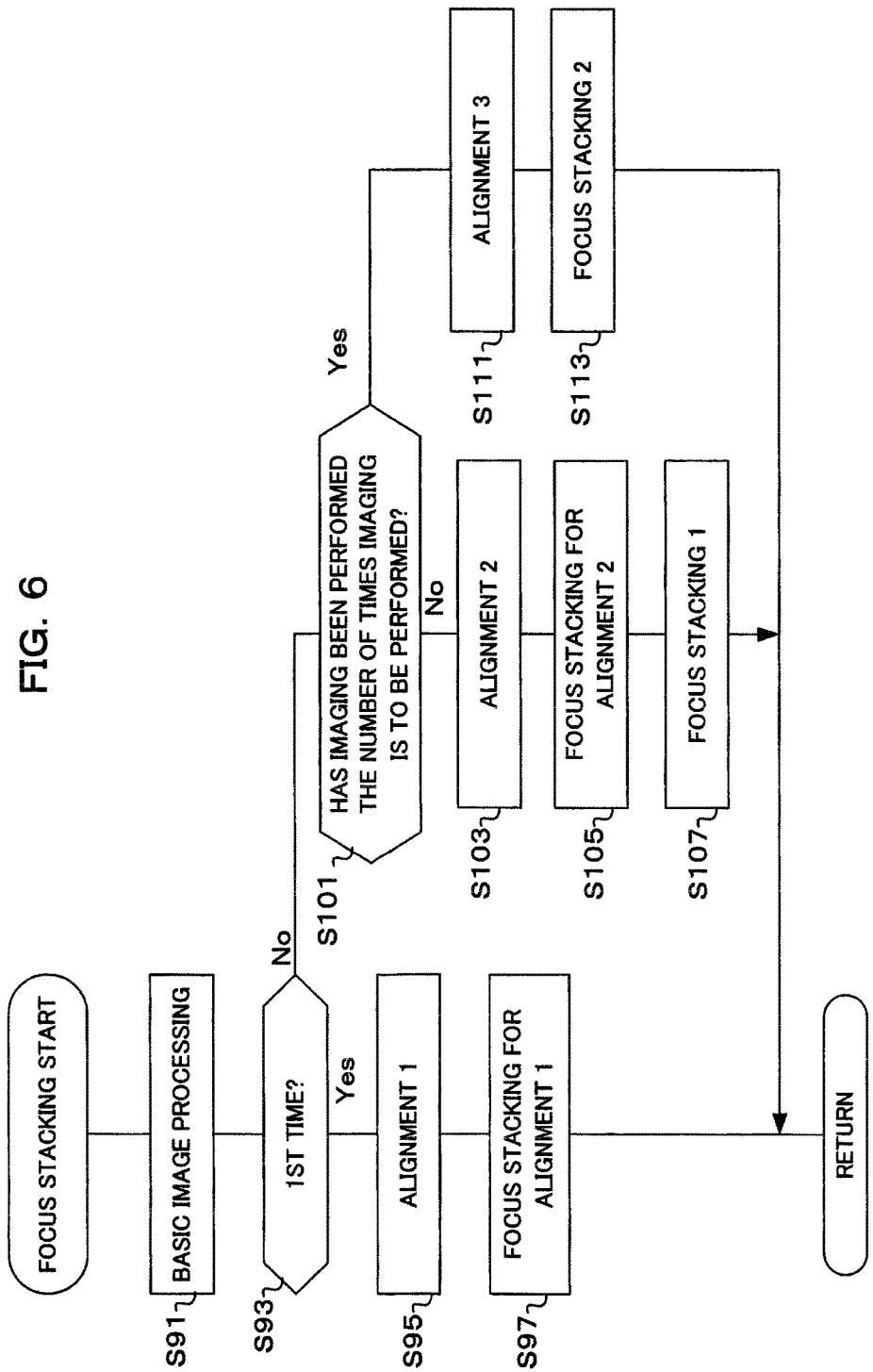

FIG. 8

| PERIOD | NUMBER OF TIMES IMAGING PERFORMED | TAKEN IMAGE | ALIGNMENT REFERENCE IMAGE | FOCUS STACKED IMAGE FOR ALIGNMENT | FOCUS STACKING |
|---|---|---|---|---|---|
| 0 | 0TH TIME | Fc0 | | | |
| | 1ST TIME | Fe1 | Fc0 | Fc0 + Fe1 = f0 | |
| | 2ND TIME | Fd1 | f0 | f0 + Fd1 = f1 | Fe1 + Fd1 = F0 |
| 1 | 3RD TIME | Fb1 | f1 | f1 + Fb1 = f2 | F0 + Fb1 = F1 |
| | 4TH TIME | Fa1 | f2 | | F1 + Fa1 = F2 |
| | 5TH TIME | Fc1 | Fc1 | | F2 + Fc1 = F3 |

FIG. 11

| PERIOD | NUMBER OF TIMES IMAGING PERFORMED | TAKEN IMAGE | ALIGNMENT REFERENCE IMAGE | FOCUS STACKED IMAGE FOR ALIGNMENT | FOCUS STACKING |
|---|---|---|---|---|---|
| 0 | 0TH TIME | Fc0 | | | |
| 1 | 1ST TIME | Fd1 | | | |
| | 2ND TIME | Fe1 | Fd1 | | Fd1 + Fe1 = F0 |
| | 3RD TIME | Fa1 | F0 | | F0 + Fa1 = F1 |
| | 4TH TIME | Fb1 | F1 | | F1 + Fb1 = F2 |
| | 5TH TIME | Fc1 | Fc1 | | F2 + Fc1 = F3 |

FIG. 15

| PERIOD | NUMBER OF TIMES IMAGING PERFORMED | TAKEN IMAGE | ALIGNMENT REFERENCE IMAGE | FOCUS STACKED IMAGE FOR ALIGNMENT | FOCUS STACKING |
|---|---|---|---|---|---|
| 0 | 0TH TIME | Fc0 | | | |
| 1 | 1ST TIME | Fa1 | Fc0 | Fc0 + Fa1 = f0 | |
| | 2ND TIME | Fb1 | f0 | f0 + Fb1 = f1 | Fa1 + Fb1 = F0 |
| | 3RD TIME | Fd1 | f1 | f1 + Fd1 = f2 | F0 + Fd1 = F1 |
| | 4TH TIME | Fe1 | f2 | | F1 + Fe1 = F2 |
| | 5TH TIME | Fc1 | Fc1 | | F2 + Fc1 = F3 |
| | 6TH TIME | Fb'1 | | | |
| 2 | 1ST TIME | Fa2 | Fb'1 | Fb'1 + Fa2 = f0 | |
| | 2ND TIME | Fb2 | f0 | f0 + Fb2 = f1 | Fa2 + Fb2 = F0 |

FIG. 18

| PERIOD | NUMBER OF TIMES IMAGING PERFORMED | TAKEN IMAGE | ALIGNMENT REFERENCE IMAGE | FOCUS STACKED IMAGE FOR ALIGNMENT | FOCUS STACKING |
|---|---|---|---|---|---|
| 0 | 0TH TIME | Fc0 | | | |
| 1 | 1ST TIME | Fa1 | Fc0 | Fc0 + Fa1 = f0 | |
| | 2ND TIME | Fb1 | f0 | f0 + Fb1 = f1 | Fa1 + Fb1 = F0 |
| | 3RD TIME | Fd1 | f1 | f1 + Fd1 = f2 | F0 + Fd1 = F1 |
| | 4TH TIME | Fe1 | f2 | | F1 + Fe1 = F2 |
| | 5TH TIME | Fc1 | Fc1 | | F2 + Fc1 = F3 |
| 3 | 1ST TIME | Fb2 | Fc2 | Fc2 + Fb2 = f0 | |
| | 2ND TIME | Fd2 | f0 | f0 + Fd2 = f1 | Fb2 + Fd2 = F0 |
| | 3RD TIME | Fc1 | Fc1 | | F0 + Fc1 = F1 |

FIG. 20

| PERIOD | NUMBER OF TIMES IMAGING PERFORMED | TAKEN IMAGE | ALIGNMENT REFERENCE IMAGE | FOCUS STACKED IMAGE FOR ALIGNMENT | FOCUS STACKING |
|---|---|---|---|---|---|
| 1 | 0TH TIME | Fc1 | | | |
| 2 | 1ST TIME | Fa2 | | | |
| 2 | 2ND TIME | Fb2 | Fc1 | Fc1 + Fb2 = f0 | |
| 2 | 3RD TIME | Fd2 | f0 | f0 + Fd1 = f1 | Fb2 + Fd2 = F0 |
| 2 | 4TH TIME | Fe2 | | | |
| 2 | 5TH TIME | Fc2 | Fc2 | | F0 + Fc2 = F1 |

IMAGING APPARATUS AND IMAGE COMPOSITING METHOD

CROSS-REFERENCE TO RELATED APPLICATIONS

Benefit is claimed, under 35 U.S.C. § 119, to the filing date of prior Japanese Patent Application No. 2016-140531 filed on Jul. 15, 2016. This application is expressly incorporated herein by reference. The scope of the present invention is not limited to any requirements of the specific embodiments described in the application.

BACKGROUND OF THE INVENTION

1. Field of the Invention

The present invention relates to an imaging apparatus and imaging method for acquiring a plurality of image data while changing focus position, and combining the plurality of image data.

2. Description of the Related Art

Taking a photograph that is in focus at all focus positions is difficult. Therefore, after acquiring image data by shooting, image data is further acquired by performing shooting again with a focus position having been moved, and a plurality of image data are acquired by repeating this operation. It has been proposed to provide image data that is in focus over a wide range of subject distance by combining the plurality of image data that have been acquired (refer to Japanese patent laid-open No. 2001-298755 (hereafter referred to as "patent publication 1")). It should be noted that this combination processing is called focus stacking processing.

Also, in order to acquire a combined image having a greater depth of field using focus stacking processing, a focus position when a release button has been pressed down fully is made a reference position, and first a focus lens is moved towards the close-up end, and then move towards the infinity end (refer to Japanese patent laid open number 2015-186088 (hereafter referred to as "patent publication 2")). A focus position when the release button is pressed down fully is an in-focus position that has been obtained using AF, and is optimal for focus precision and carrying out alignment.

SUMMARY OF THE INVENTION

An imaging apparatus of a first aspect of the present invention comprises an imaging lens for forming a subject image on an imaging surface, and an image sensor, positioned on the imaging surface, for capturing the subject image and acquiring image data, a processor having a focus bracket setting section, a focus stacking control section and a live view control section, the focus bracket setting section carrying out setting of a number of times of imaging and focus position setting on the imaging surface in accordance with the number of times of imaging, the focus stacking control section performing imaging at a plurality of focus positions that have been set by the focus bracket setting section, carrying out successive image combination for each imaging, and, after imaging for the number of times imaging is carried out that has been set by the focus bracket setting section, generating a focus stacked image, and a display device that displays a focus stacked image that has been generated by the focus stacking control section, the display device including a display panel and a display driver, wherein the live view control section repeatedly carries out a series of processing for setting of focus positions by the focus bracket setting, generation of the focus stacked image by the focus stacking control section, and display of the focus stacked image by the display device, and the focus stacking control section, performs image combination of an image that has been taken at the final focus position with a previously taken image or a previously combined image, with position of the finally taken image as a reference for alignment at the time of image combination, and on the other hand performs image combination of taken images other than an image that has been taken at the final focus position with a previously taken image or an image that was previously combined, as the reference for alignment.

An image compositing method of a second aspect of the present invention is an image compositing method for an imaging apparatus, the imaging apparatus comprising: an imaging lens for forming a subject image on an imaging surface, and an imaging sensor, positioned on the imaging surface, for capturing the subject image and acquiring image data, the image compositing method comprising: carrying out setting of a number of times of imaging and setting of a plurality of focus positions on the imaging surface in accordance with the number of times of imaging, carrying out imaging at the plurality of focus positions that have been set, carrying out successive image combination for each imaging, and generating a focus stacked image after imaging the plurality of times that has been set, displaying the focus stacked image, repeatedly carrying out a series of processing to set the plurality of focus positions, generate the focus stacked image and display the focus stacked image, performing image combination of an image that has been taken at the final focus position with a previously taken image or a previously combined image, with position of the finally taken image as a reference for alignment at the time of image combination, and on the other hand performing image combination of taken images other than an image that has been taken at the final focus position with a previously taken image or an image that was previously combined, as the reference for alignment.

BRIEF DESCRIPTION OF THE DRAWINGS

FIG. 6 is a flowchart showing a focus stacking operation of the camera of the first embodiment of the present invention.

FIG. 8 is a drawing showing taken images, focus stacked images for alignment, and focus stacked images, acquired and generated every time imaging is carried out, in the camera of the first embodiment of the present invention.

FIG. 11 is a drawing showing taken images, focus stacked images for alignment, and focus stacked images, acquired and generated every time imaging is carried out, in the camera of the second embodiment of the present invention.

FIG. 15 is a drawing showing taken images, focus stacked images for alignment, and focus stacked images, acquired and generated every time imaging is carried out, in the camera of the third embodiment of the present invention.

FIG. 18 is a drawing showing taken images, focus stacked images for alignment, and focus stacked images, acquired and generated every time imaging is carried out, in the camera of the fourth embodiment of the present invention.

FIG. 20 is a drawing showing taken images, focus stacked images for alignment, and focus stacked images, acquired and generated every time imaging is carried out, in the camera of the modified example of the fourth embodiment of the present invention.

DETAILED DESCRIPTION OF THE PREFERRED EMBODIMENTS

An example where a digital camera is adopted as an embodiment of the present invention will be described in the following. This digital camera has an imaging section, with a subject image being converted to image data by this imaging section, and the subject image being subjected to live view display on a display device arranged on the rear surface of the camera body based on this converted image data. A photographer determines composition and photo opportunity by looking at the live view display. At the time of a release operation image data is stored in a storage medium. Image data that has been stored in the storage medium can be played back and displayed on the display device if playback mode is selected.

Also, with this camera if focus stacking mode has been set, the focus position of the photographing lens is sequentially moved, and a plurality of images for focus stacking are acquired. As a reference for carrying out alignment for focus stacking, a different taken image (or different combined image) is used in the case of shooting at a final focus position, and in the case of shooting at focus positions other than the final position (refer, for example, to FIG. 8).

Figure 1:
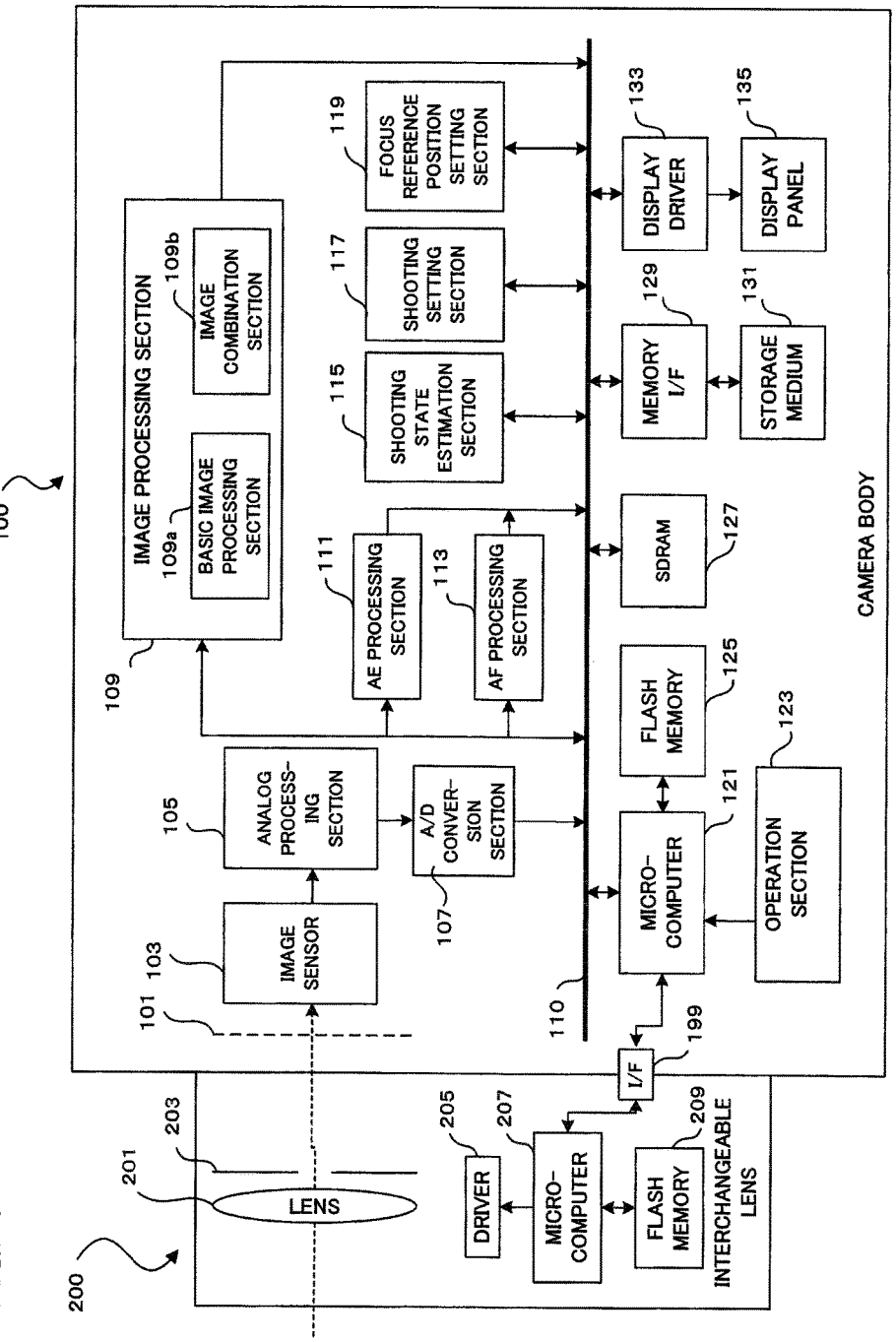
FIG. 1 is a block diagram mainly showing the electrical structure of a camera of a first embodiment of the present invention.

FIG. 1 is a block diagram mainly showing the electrical structure of a camera of a first embodiment of the present invention. This camera has a camera body 100 and an interchangeable lens 200 that can be attached to and detached from the camera body 100. With this embodiment, the photographing lens is an interchangeable lens, but this is not limiting, and it is also possible to have a digital camera of a type where a photographing lens is fixed to the camera body.

The interchangeable lens 200 is made up of a photographing lens 201, an aperture 203, a driver 205, a microcomputer 207 and a flash memory 209, and has an interface (hereafter referred to as I/F) 199 between the interchangeable lens 200 and the camera body 100, which will be described later.

The photographing lens 201 is constituted by a plurality of optical lenses (including a focus lens for focus adjustment) for forming a subject image, and is a fixed focal length lens or a zoom lens. A focus lens for focus adjustment functions as a photographing lens that images a subject on an imaging surface. An aperture 203 is arranged to the rear on the optical axis of this photographing lens 201, and the aperture 203 has a variable opening diameter to control amount of subject light flux passing through the photographing lens 201.

Also, the photographing lens 201 is capable of being moved in the optical axis direction by the driver 205, with focus position being controlled by moving a focus lens within the photographing lens 201 based on control signals from the microcomputer 207. Also, in a case where the photographing lens 201 is a zoom lens, focal length is also controlled.

The present invention is not limited to a camera, and can also be applied to an optical instrument in which focal position is fixed. For example, in a case where there no focus lens that varies focus position is provided, such as a digital microscope, which is a microscope apparatus with fixed focal position, a distance between the photographing lens and a subject is adjusted by raising and lowering a stage (not illustrated) on which the subject is fixed, or raising and lowering the photographing lens 201, to cause movement of in-focus position. The driver 205 also controls opening diameter of the aperture 203. On the other hand, the aperture 203 provided in a digital microscope often has a fixed opening diameter.

The microcomputer 207 that is connected to the driver 205 is connected to the I/F 199 and the flash memory 209. The microcomputer 207 operates in accordance with a program stored in the flash memory 209, to perform communication with a microcomputer 121 within the camera body 100, which will be described later, and performs control of the interchangeable lens 200 based on control signals from the microcomputer 121.

The microcomputer 207 acquires focus position of the focus lens from a focus position detection section (not shown), and acquires zoom position of the zoom lens from a zoom position detection section (not shown). The acquired focus position and zoom position are transmitted to the microcomputer 121 within the camera body 100.

Besides the previously described program, various information such as optical characteristics of the interchangeable lens 200 and adjustment values are stored in the flash memory 209. The microcomputer 207 transmits these various items of information to the microcomputer 121 within the camera body 100. The I/F 199 is an interface for carrying out communication between the microcomputer 207 inside the interchangeable lens 200 and the microcomputer 121 inside the camera body 100.

Inside the camera body 100, a mechanical shutter 101 is arranged on the optical axis of the photographing lens 201.

This mechanical shutter 101 controls the time for which subject light flux passes, and a well-known focal plane shutter or the like is adopted. Behind this mechanical shutter 101, an image sensor 103 is arranged, at a position where the subject image is formed by the photographing lens 201.

The image sensor 103 has photodiodes that constitute each pixel arranged two-dimensionally in a matrix shape, each photodiode generates photoelectric conversion current in accordance with received light amount, and this photoelectric conversion current is the subject of charge storage by a capacitor connected to each photodiode. A Bayer array RGB filter is arranged on the front surface of each pixel. The image sensor 103 also has an electronic shutter. This electronic shutter carries out control of exposure time by controlling the time from charge storage until charge readout of the image sensor 103.

The image sensor 103 is not limited to a Bayer array, and a layered type such as Foveon (Registered trademark), for example, can also be used. The image sensor 103 functions as an image sensor that is positioned on an imaging surface, for acquiring image data by forming a subject image.

The image sensor 103 is connected to an analog processing section 105, and this analog processing section 105 performs wave shaping on the photoelectric conversion signals (analog image signals) that have been read out from the image sensor 103 after reducing reset noise etc., and also carries out gain increase so as to achieve an appropriate brightness.

The analog processing section 105 is connected to an A/D conversion section 107. This A/D conversion section 107 has an A/D conversion circuit, and performs analog to digital conversion on the analog image signals, and outputs the digital image signals (hereafter referred to as image data) to a bus 110. In this application, raw image data generated before image processing in the image processing section 109 is called RAW data.

The bus 110 is a transfer path for transferring various data, that has been read out or generated inside the camera body 100, within the camera body 100. Besides the previously described A/D conversion section 107, an image processing section 109, AE (Auto Exposure) processing section 111, AF (Auto Focus) processing section 113, shooting state estimation section 115, shooting setting section 117, focus reference position setting section 119, microcomputer 121, SDRAM 127, memory interface (hereafter referred to as memory I/F) 129, and display driver 133 are connected to the bus 110.

The image processing section 109 has a basic image processing section 109a for carrying out ordinary image processing, and an image combination section 109b for carrying out image combination. When combining a plurality of images, the basic image processing section 109a and the image combination section 109b are used. The image processing section 109 in this embodiment is a dedicated image processing processor comprising an arithmetic circuit for carrying out image processing calculations. However, this structure is not limiting, and it is also possible to have a structure where, for example, image processing calculations are handled in a general purpose signal processing processor such as a digital signal processor (DSP), based on image processing programs, and some of the calculations maybe executed by a general purpose signal processing processor such as a DSP, and a CPU.

The basic image processing section 109a performs optical black (OB) subtraction processing, white balance (WB) correction, demosaicing processing in the case of Bayer data, color reproduction processing, gamma correction processing, color matrix computation, noise reduction (NR) processing, edge enhancement processing etc. on RAW data. With a single photograph, and if a special effect or the like such as art filter or focus stacking is not set, image processing is completed with only processing by this basic image processing section 109a.

The image combination section 109b carries out various image combination in accordance with a combination mode that is set etc. The image combination section 109b carries out combination of image data using a plurality of image data that have been acquired under different conditions such as focus position, aperture value etc. With this embodiment, as will be described later, a combination mode, such as focus stacking for increasing depth of field, can be set. In the event that focus stacking mode is set, the image combination section 109b carries out alignment of a plurality of image data that have been taken at a plurality of focus positions, extracts regions of high sharpness (contrast) of the images, and generates an image having a different depth of field to a single image by combining the high sharpness regions.

It should be noted that although not illustrated, an image compression section and an image expansion section are provided within the image processing section 109. At the time of storage of image data to the storage medium 131, the image compression section subjects image data that has been read out from the SDRAM 127 to compression in accordance with various compression formats such as JPEG compression in the case of a still picture, or MPEG in the case of a movie. Also, the image expansion section carries out expansion of JPEG image data and MPEG image data for image playback display. In the expansion, a file that is stored in the storage medium 131 is read out, and after being subjected to expansion processing in the image expansion section the expanded image data is temporarily stored in the SDRAM 127.

Also, with this embodiment, the JPEG compression system and MPEG compression system are adopted as the image compression system, but the compression system is not limited to this and other compression systems maybe used, such as TIFF, H.264 etc. Also, the compression system may be lossless compression or lossy transmission.

The AE processing section 111 has an AE processing circuit, and measures subject brightness based on image data that has been input via the bus 110, and outputs this subject brightness information to the microcomputer 121 via the bus 110. A dedicated photometric sensor for subject brightness measurement may be provided, but in this embodiment subject brightness is calculated based on image data.

The AF processing section 113 has an AF processing circuit, and extracts signals for high frequency components from image data, acquires a focus evaluation value using integration processing, and outputs the focus evaluation value via the bus 110 to the microcomputer 121. In this embodiment, focusing of the photographing lens 201 is carried out using the so-called contrast method. With this embodiment AF control using a contrast method is given as an example, but it is also possible to carry out focusing by AF control using phase difference AF, where subject light flux is divided and phase difference sensors are provided on the optical paths, or a phase difference sensor is provided on an image sensor. The AF processing section 113 functions as an AF processing circuit that calculates AF level representing focus state based on image data.

The shooting state estimation section 115 carries out estimation of shooting states, as to whether shooting is close up shooting or long-distance shooting, from subject distance based on in-focus position of the focus lens of the photographing lens 201. As the shooting state estimation, estimation may also be based on shooting mode, for example, as well as subject distance. In the event that a shooting mode appropriate to close-up shooting, such as macro mode, has been set, close-up shooting is estimated. Also, contrast information may be acquired while scanning the focus lens, subject distance obtained from this contrast information, and whether or not it is close up shooting estimated.

The shooting setting section 117 carries out setting of a plurality of focus lens positions for at the time of shooting for focus stacking, and setting for shooting a plurality of times in the imaging section such as the image sensor 103. The imaging section sets an order for a plurality of occurrences of imaging in accordance with setting of the shooting setting section 117. The shooting setting section 117 functions as a focus bracket setting section that carries out setting of a number of times of imaging and focus position setting for the focusing lens in accordance with the number of times of imaging (refer to S71 in FIG. 4, and to FIG. 5). The focus bracket setting section sets final focus position of the focus lens as AF commencement position (refer, for example, to Fc0, Fc1, Fc2 etc. in FIG. 7).

It should be noted that in this embodiment, the shooting setting section 117 is described separately to the microcomputer 121, but in actual fact is implemented by the microcomputer 121. However, a processor (for example, a CPU etc.) that is separate to the microcomputer 121 may be provided, to realize functions of the shooting setting section 117.

The focus reference position setting section 119 sets a focus reference position. This focus reference position setting section 119 sets a focus reference position in order to acquire an image that will constitute a reference at the time of performing focus stacking, and with this embodiment a focus position at the time of shooting is made the reference position, but this is not limiting and the reference position may also be set by the user, for example.

The microcomputer 121 has a CPU (central Processing Unit) and peripheral circuits for this CPU, and provides a function as a control section for this entire camera, and performs overall control of various sequences of the camera in accordance with program code stored in the flash memory 125. Besides the previously described I/F 199 an operation section 123 and a flash memory 125 are connected to the microcomputer 121. The microcomputer 121 functions as a processor having a focus bracket setting section, a focus stacking control section and a live view control section.

Figure 3:
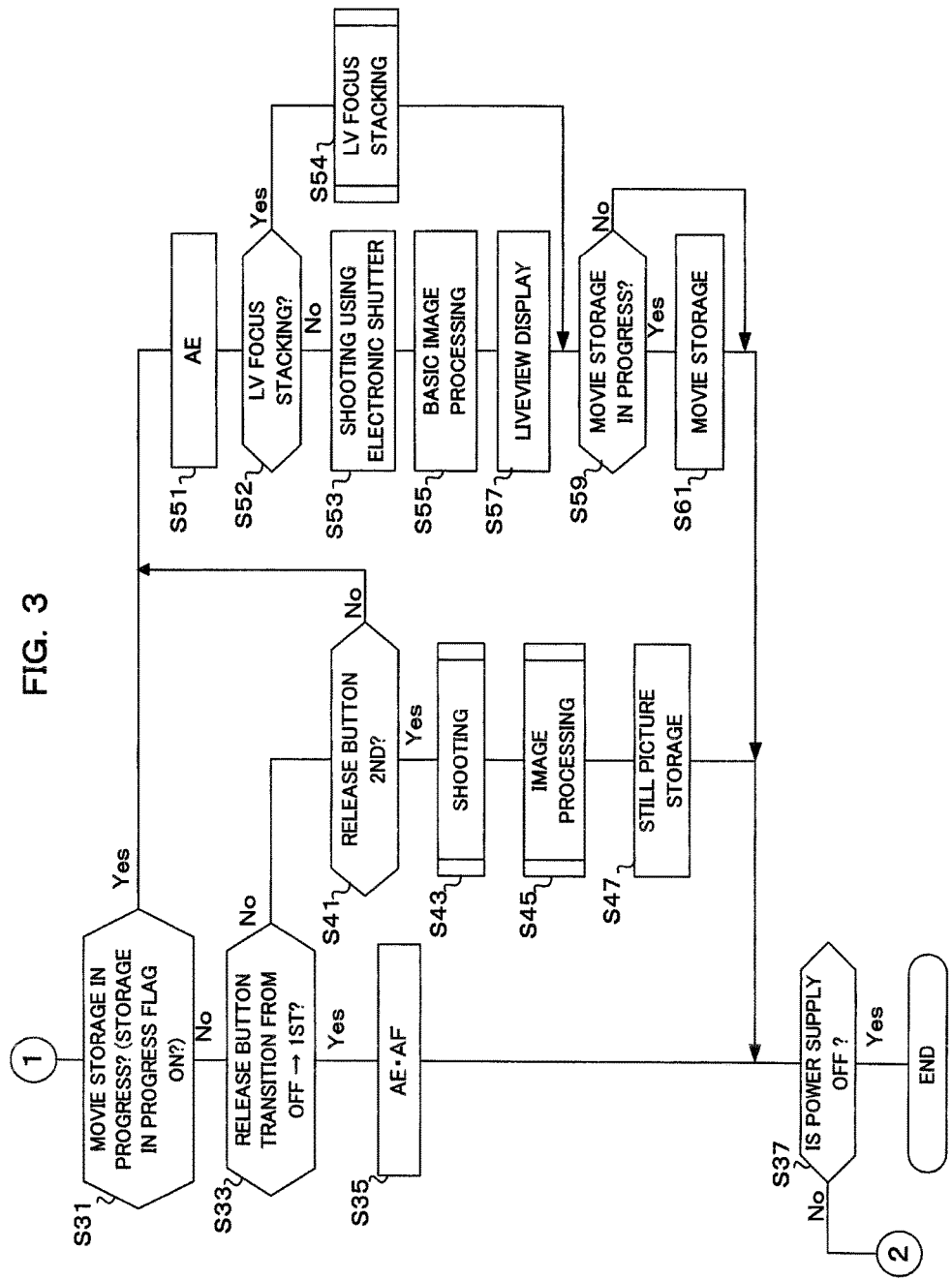
FIG. 3 is a flowchart showing main operation of the camera of the first embodiment of the present invention.
Figure 4:
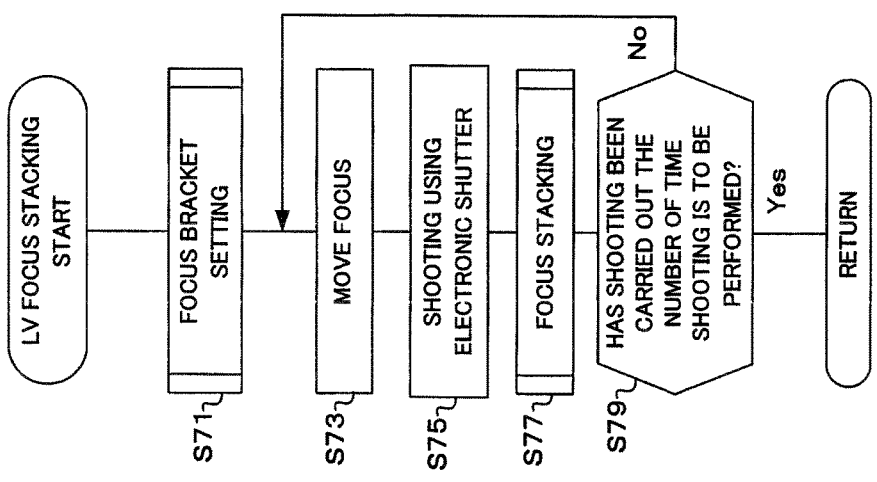
FIG. 4 is a flowchart showing a live view focus stacking operation of the camera of the first embodiment of the present invention.

The microcomputer 121, in collaboration with the image combination section 109*b*, functions as a focus stacking control section that performs imaging at a plurality of focus positions that have been set by the focus bracket setting section, carries out successive image combination each time imaging is performed, and generates a focus stacked image after imaging has been performed for the number of times that has been set by the focus bracket setting section (refer, for example, to S54 in FIG. 3, and to FIG. 4). The microcomputer 121 also functions as a live view control section that repeatedly carries out a series of processing for setting of focus position depending on focus bracket setting, generation of a focus stacked image by the focus stacking control section, and display of the focus stacked image by the display device (refer, for example, to S54 in FIG. 3, and to FIG. 4).

The focus stacking control section described above performs image combination of an image that has been taken at the final focus position with a previously taken image or a previously combined image, with position of the finally taken image as a reference for alignment at the time of image combination (refer, for example, to No in S101 to S111, and S113, in FIG. 6), and on the other hand performs image combination of taken images other than an image that has been taken at the final focus position with a previously taken image or an image that was previously combined, as the reference for alignment (refer, for example, to No in S101 to S107 in FIG. 6).

The focus stacking control section makes a taken image at a final focus position a reference, and carries out alignment for a taken image for the next position to this final focus position, carries out focus stacking for alignment using this taken image that has been aligned and a taken image for the next position to the final focus position, and generates a focus stacked image for alignment (refer, for example, to S95 and S97 in FIG. 6).

The focus stacking control section makes a focus stacked image for alignment a reference, carries out alignment of the finally taken image, and carries out focus stacking using this taken image that has been aligned and the focus stacked image for alignment (refer, for example, to S103 and S105 in FIG. 6). The focus stacking control section also carries out alignment of a focus stacked image that has been generated directly before the final focus position with a taken image of the final focus position made reference, and generates a final focus stacked image using this focus stacked image that has been aligned and a taken image for the final focus position (refer, for example to S111 and S113 in FIG. 6).

The operation section 123 includes operation members such as various input buttons, like a power supply button, release button, a movie button, playback button, menu button, cross-shaped key, and OK button, and various input keys, and detects operating states of these operation members and outputs the result of detection to the microcomputer 121. The microcomputer 121 executes various sequences according to user operation based on the result of detection of the operation members from the operation section 123. The power supply button is an operation member for instructing to turn a power supply of the camera on or off. If the power supply button is pressed, the power supply of the camera is turned on, and if the power supply button is pressed once again the power supply of the camera is turned off.

The release button is made up of a first release switch that turns on when the button is pressed down half way, and a second release switch that is turned on when the button is pressed down further from the half-pressed state to be pressed down fully. The microcomputer 121 executes shooting preparation sequences such as an AE operation and AF operation if the first release switch is turned on. Also, if the second release switch is turned on shooting is carried out by executing a series of shooting sequences to control the mechanical shutter 101 etc., acquire image data based on a subject image from the image sensor 103 etc., and store this image data in the storage medium 131.

The movie button is an operation button for instructing start and finish of movie shooting, and if the movie button is initially operated movie shooting commences, and movie shooting finishes when it is operated again. The playback button is an operation button for setting and canceling playback mode setting, and if playback mode is set image data of a taken image is read out from the storage medium 131, and a taken image is playback displayed on the display panel 135.

The menu button is an operation button for causing display of menu screens on the display panel 135. It is possible to carry out the various camera settings on the menu screens. As camera setting there is, for example, combination mode, such as focus stacking, and as combination mode, besides focus stacking there are modes such as HDR combination and super resolution combination. Also, in a case where focus stacking mode has been set, it is possible to set live view focus stacking mode where focus stacking processing is carried out during live view display, and a combined image that has been acquired using this focus stacking processing is displayed.

The flash memory 125 stores a program for executing the various sequences of the microcomputer 121. The microcomputer 121 carries out overall control of the camera based on this program.

The SDRAM 127 is an electrically rewritable volatile memory for temporary storage of image data etc. This SDRAM 127 temporarily stores image data that has been output from the A/D conversion section 107, and image data that has been processed in the image processing section 109.

The memory I/F 129 is connected to the storage medium 131, and carries out control for reading and writing of data, such as image data and headers attached to image data, to and from the storage medium 131. The storage medium 131 is a storage medium such as a memory card that can be loaded into and taken out of the camera body 100, but this is not limiting and it may also be a hard disk or the like built into the camera body 100. The storage medium 131 stores combined image data that has been generated by the focus stacking processing.

The display driver 133 is connected to the display panel 135, and reads out from the SDRAM 127 and storage medium 131 to display an image on the display panel 135 based on image data that has been expanded by the image expansion section within the image processing section 109. The display panel 135 is arranged on a rear surface of the camera body 100, and carries out image display. The display panel 135 is arranged on a display surface of an external section of the camera body, such as the rear surface, which makes it a display device that is prone to the effects of external light, but it is possible to install a large-sized display panel. It should be noted that as a display device it is possible to adopt various display panels such as a liquid crystal display panel (LCD, TFT), or organic EL etc. A so-called electronic viewfinder (EVF) with which a display panel is observed by means of an eyepiece may also be provided.

As image display modes of the display panel 135, there are Quickview Display for displaying image data to be stored for only a short time immediately after being taken, playback display of image files for still images and movies that have been stored in the storage medium 131, and movie display such as live view display. The display panel 135 functions as a display device that displays a focus stacked image that has been generated by the focus stacking control section.

Next, main processing of the camera of this embodiment will be described using the flowcharts shown in FIG. 2 and FIG. 3. The flowcharts shown in FIG. 2 and FIG. 3, and in FIG. 4-FIG. 6, and FIG. 9, FIG. 12, FIG. 13 and FIG. 16 which will be described later, are executed by the microcomputer 121 controlling each section in accordance with program code stored in the flash memory 125.

Figure 2:
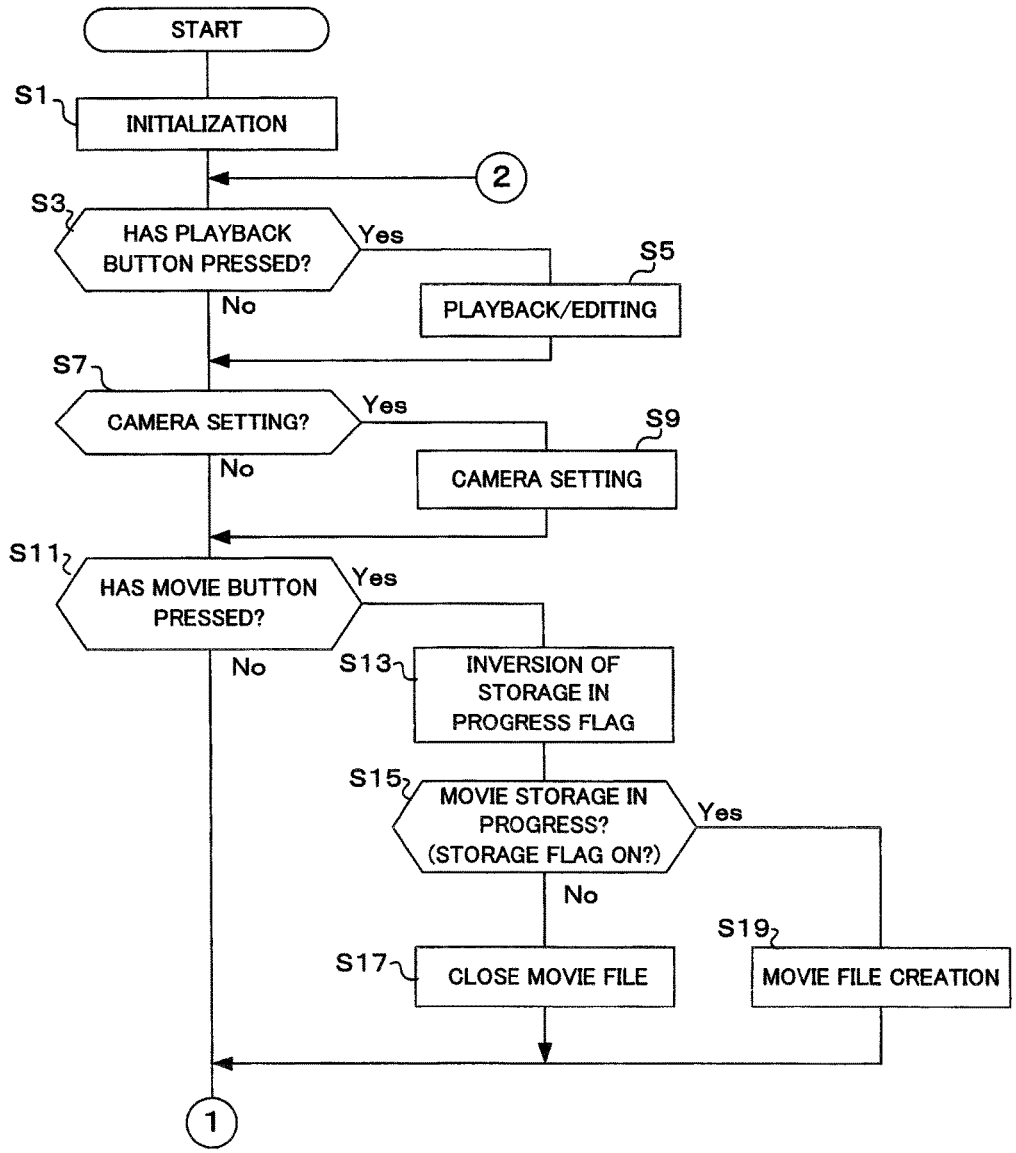
FIG. 2 is a flowchart showing main operation of the camera of the first embodiment of the present invention.

If the power supply button within the operation section 123 is operated and the power supply is turned on, operation of the main flow shown in FIG. 2 is started. Once operation has commenced, initialization is first executed (S1). As part of the initialization, mechanical initialization and electrical initialization, such as initialization of various flags etc., are carried out. As one of the various flags, a storage in progress flag indicating whether or not movie storage is in progress is reset to off (refer to Steps S13, S15 and S31).

Once initialization has been carried out, it is next determined whether or not the playback button has been pressed (S3). Here, determination is carried out by detecting the operating state of the playback button within the operation section 123. If the result of this determination is that the playback button has been pressed, playback/editing mode is executed (S5). Here, image data is read out from the storage medium 131, and a table of still images and movies is displayed on the LCD 135. The user selects an image from within the table by operating the cross-shaped key and decides on the image using the OK button. It is also possible to carry out editing of a selected image.

If playback/editing is executed in step S5, or if the result of determination in step S3 was that the playback button had not been pressed, it is determined whether or not camera setting will be carried out (S7). When the menu button within the operation section 123 has been operated, camera setting is carried out on a menu screen. In this step, therefore, determination is based on whether or not this camera setting has been carried out.

If the result of determination in step S7 is camera setting, camera setting is carried out (S9). As described previously, it is possible to carry out various camera settings on the menu screens. As camera settings it is possible to set, for example, modes such as normal shooting and focus stacking as shooting modes. Also, in a case where focus stacking mode has been set, it is possible to carry out setting of live view focus stacking mode for displaying a live view focus stacked image that has been composited by focus stacking processing.

If camera setting has been carried out in step S9, or if the result of determination in step S7 was not camera setting, it is next determined whether or not the movie button has been pressed (S11). Here the microcomputer 121 carries out determination based on operating state of the movie button input from the operation section 123.

If the result of determination in step S11 is that the movie button has been pressed, inversion of the storage in progress flag is next carried out (S13). The storage in progress flag is set to on (1) if movie shooting is progress, or set to off (0) if a movie is not being shot. In this step the flag is inverted, that is, if it is set to on (1) it is inverted to off (0), and if it is set to off (0) it is inverted to on (1).

Once inversion of the storage in progress flag has been carried out in step S13, it is next determined whether or not storage of a movie is in progress (S15). Here, determination is based on whether the storage in progress flag, which was inverted in step S13, is set to on or set to off.

If the result of determination in step S15 is that movie storage is in progress, a movie file is created (S19). Movie storage is carried out in step S61, which will be described later, but in this step a movie file for movie storage is created, and preparation so as to be able to store image data of the movie is performed.

On the other hand, if the result of determination is that movie storage is not in progress, the movie file is closed (S17). The movie file is closed in this step because the movie button has been pressed and movie shooting is completed. When closing the movie file, the movie file is placed in a state where it can be played back as a movie file by storing a number of frames in a header of the movie file etc., and file writing is completed.

Once the movie file has been closed in step S17, or if a movie file is created in step S19, or if the result of determination in step S11 was that the movie button was not pressed, it is next determined whether or not movie storage is in progress (S31). In this step, similarly to step S15, determination is based on whether the storage in progress flag is on or off.

If the result of determination in step S31 is that movie storage is not in progress, it is next determined whether or not the release button has been pressed halfway, in other words, whether or not the first release switch has changed from off to on (S33). For this determination, the state of the first release switch that is linked to the release button is detected by the operation section 123, and determination is carried out based on the result of detection. If the result of detection is that the first release switch has changed from off to on, the result of determination becomes Yes, while on the other hand if an on state or an off state is maintained the result of determination becomes No.

If the result of determination in step S33 is that the release button has been pressed down half way, then in the case where the first release has transitioned from off, an AE/AF operation is executed (S35). Here, the AE processing section 111 detects subject brightness based on image data acquired by the image sensor 103, and calculates shutter speed and aperture value etc. for correct exposure based on this subject brightness.

An AF operation is also carried out in step S35. Here, the driver 205 moves focus position of the photographing lens 201 by means of the microcomputer 207 inside the interchangeable lens 200, so that a focus evaluation value that has been acquired by the AF processing section 113 becomes a peak value. As a result, if the release button is pressed down halfway when movie shooting is not being carried out, focusing of the photographing lens 201 is carried out at that point in time, and the lens is moved to an in-focus position. After that processing advances to step S37.

If the result of determination in step S31 is that the release button has not transitioned from off to the first release, it is next determined whether or not the release button has been pressed down fully, and the second release switch has been turned on (S41). In this step, the state of the second release switch that is linked to the release button is detected by the operation section 123, and determination is carried out based on the result of detection.

If the result of determination in step S41 is that the release button is pressed down fully and that the second release switch has been turned on, shooting is carried out (S43). Here, the aperture 203 is controlled with the aperture value that was calculated in step S33, and the shutter speed of the mechanical shutter 101 is controlled with the calculated shutter speed. Then, once the exposure time corresponding to the shutter speed has elapsed, image signals are read from the image sensor 103, and RAW data that has been processed by the analog processing section 105 and the A/D conversion section 107 is output to the bus 110.

Also, in a case where focus stacking mode has been set, first a shooting state is estimated, shooting setting is carried out based on estimated results for the shooting state (more specifically, setting of focus position, where shooting for focus stacking is performed, is carried out), the focus lens is moved based on this shooting setting, shooting is carried out once the focus position that has been set is reached, and a plurality of image data are acquired.

If shooting is carried out in step S43, image processing is carried out (S45). RAW data that has been acquired by the image sensor 103 is read out, and image processing is carried out by the image processing section 109. Also, in the case where focus stacking mode has been set, focus stacking is carried out using the plurality of image data that were acquired in step S43.

Once image processing has been carried out, still picture storage is next carried out (S47). Here, image data for a still picture to which image processing has been applied is stored in the storage medium 131. At the time of still picture storage, storage is carried out using a format that has been set (storage format can be set in the camera setting of step S9). In the event that JPEG has been set, the data that has been subjected to image processing is subjected to JPEG compression in the image compression section, and stored. In the case of TIFF format, image data is converted to RGB data and stored in RGB format. Also, in the event that RAW storage is set, if combination is carried out with RAW data that has been acquired by shooting, combined RAW data is also stored. A storage destination for image data may be the storage medium 131 within the camera body, or may be storage to an external device via a communication section (not shown).

If the result of determination in step S41 is that the second release switch was not turned on, or if the result of determination in step S31 was that movie storage is in progress, next an AE operation is carried out (S51). If the determination in previously described step S41 is no, it is a situation where no operation was carried out for the release button, and in this case live view display of step S57, which will described later, is carried out. Also, if the determination in previously described step S31 is Yes, movie storage is in progress. In this step, shutter speed and ISO sensitivity for the electronic shutter of the image sensor 103 in order to carry out live view display or movie shooting at the correct exposure are calculated.

If AE has been carried out, it is next determined whether or not there is live view (LV) focus stacking (S52). Since the user can set live view focus stacking mode on a menu screen (refer to step S9), in this step it is determined whether or not live view focus stacking mode has been set through a menu screen.

If the result of determination in step S52 is that live view focus stacking mode has been set, live view focus stacking is carried out (S54). Here, the focus lens is moved, exposure to the image sensor 103 is controlled using an electronic shutter, image data after exposure is read out, and focus stacking processing is carried out using this image data that has been read out. Detailed operation of this live view focus stacking will be described later using FIG. 4.

If the result of determination in step S52 is that live view focus stacking mode has been set, shooting using the electronic shutter is carried out (S53). Here, the subject image is converted to image data. Specifically, charge storage is performed during an exposure time that is determined by the electronic shutter of the image sensor 103, and image data is acquired by reading out the stored charge once the exposure time has elapsed.

Once shooting using the electronic shutter has been carried out, image processing is carried out on the acquired image data (S55). In this step, basic image processing such as WB correction, color matrix calculation, gamma conversion, edge enhancement, noise reduction etc. is carried out by the basic image processing section 109a.

If basic image processing has been carried out in step S55, or if live view focus stacking has been carried out in step S54, next live view display is carried out (S57). In this step, live view display is carried out on the display panel 135 using the image data that was subjected to basic image processing in step S55, or the image data that was subjected to live view focus stacking processing, that was generated in step S54. Specifically, image data was acquired in step S53 or S54, and image processing was carried out, and so update of the live view display is carried out using an image that has been subjected to this processing. A photographer can determine composition and shutter speed by observing the live view display. Also, in a case where live view focus stacking mode has been set, it is possible to carry out setting of composition and focus position by observing a completed predicted image.

Once live view display has been carried out in step S57, it is next determined whether or not movie storage is in progress (S59). Here it is determined whether or not the storage in progress flag is on. If the result of this determination is that movie storage is in progress, movie storage is carried out (S61). Here, image data read out from the image sensor 103 is subjected to image processing to give image data for a movie, and stored in a movie file.

If movie storage has been carried out in step S61, or if the result of determination in step S59 was that movie storage was not in progress, or if still picture storage was carried out in step S47, or if AE/AF was carried out in step S35, it is next determined whether or not the power supply is off (S37). In this step it is determined whether or not the power supply button of the operation section 123 has been pressed again. If the result of this determination is not power off, processing returns to step S3. On the other hand, if the result of determination is power off, a termination operation of the main flow is executed and then this main flow is terminated.

In this way, in the main flow of the first embodiment of the present invention, it is possible to set a shooting mode that combines a plurality of image data, such as focus stacking mode (S9), and in a case where focus stacking mode has been set, if the release button is press down fully (S41 Yes), then in step S43 the focus lens is moved and the exposure time is controlled using the electronic shutter, in step S45 focus stacking image data is generated by combining a plurality of image data that have been acquired from the image sensor 103, and in step S47 image data that has been subjected to focus stacking is stored.

Also, if live view focus stacking mode has been set, then during live view display the focus lens is moved and exposure time is controlled using the electronic shutter, focus stacking image data is generated by combining a plurality of image data that have been acquired from the image sensor 103, and in step S57 an image resulting from this focus stacking is displayed as a live view image.

Next, detailed operation of the live view focus stacking of step S54 will be described using the flowchart shown in FIG. 4. If the flow for live view focus stacking is commenced, first of all focus bracket setting is carried out (S71). Here a number of times to carry out shooting for focus stacking, imaging position, and imaging order etc. are set. Detailed operation of this focus bracket setting will be described later using FIG. 5.

Once focus bracket setting has been carried out, next focus movement is carried out (S73). Here, the driver 205, by mean of the microcomputer 207 within the interchangeable lens 200, causes movement of the focus lens to the focus position that was set in the focus bracket setting of step S71, and once the focus position has been reached movement of the focus lens is stopped at that position.

Once focus movement has been carried out, next shooting is carried out using the electronic shutter (S75). Here, exposure time of the image sensor 103 is controlled in accordance with shutter speed that was calculated in step S51 (refer to FIG. 3). During this exposure time, pixels of the image sensor 103 carry out photoelectric conversion, and image data is read out once the exposure time has elapsed.

Once shooting using the electronic shutter has been carried out, focus stacking is carried out (S77). Here, focus stacking is carried out using image data that was read out in step S75, and focus stacking image data that was combined previous to that. Detailed operation of this image focus stacking will be described later using FIG. 6.

Once focus stacking has been carried out, it is determined whether or not shooting has been carried out for a predetermined number of times (S79). Here, it is determined whether or not shooting has been carried out for the number of times of shooting that was set in step S71. If the result of this determination is that shooting has not been carried out the set number of times of shooting, processing returns to step S73 and the next shooting is carried out. On the other hand, if shooting has been carried out the set number of times of shooting, this flow is terminated and the originating flow is returned to.

Figure 5:
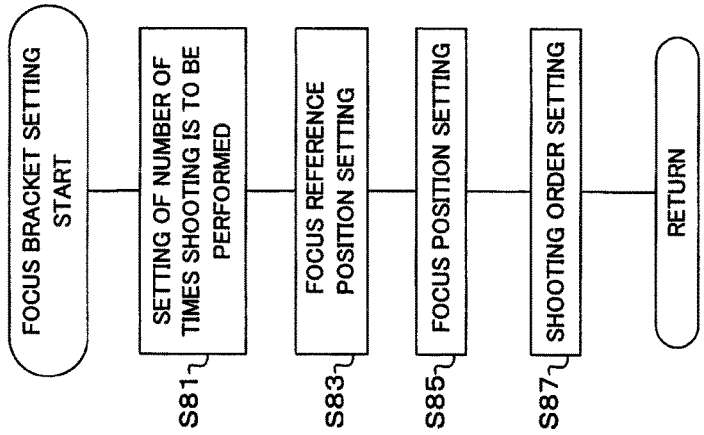
FIG. 5 is a flowchart showing a focus bracket setting operation of the camera of the first embodiment of the present invention.

Next, detailed operation of the focus bracket setting in step S71 (refer to FIG. 4) will be described using the flowchart shown in FIG. 5. If the flow for focus bracket setting is commenced, first of all setting of a number of times of shooting is carried out (S81). This number of times of shooting is set using the shooting setting section 117. The number of times of shooting set here may be a number of times determined automatically in accordance with conditions such as storage capacity of the storage medium 131 and SDRAM 127 etc., and may be a number of times that has been set by the user. If set by the user, an upper limit value is determined as a design value.

Once the number of times of shooting has been set, next a focus reference position is set (S83). Here, the focus reference position setting section 119 sets a position of the focus lens when the release button has been pressed down fully (at the time of 2nd release) as a focus reference position. It should be noted that besides this, a focus position that has been manually set by the user may be set as the reference position.

Once setting of the focus reference position has been carried out, next focus position setting is carried out (S85). Here setting of a plurality of focus positions used in shooting for focus stacking is carried out. Specifically, it is preferable to make the focus reference position that was set in step S83 a center, and to set a number images to be taken to the same number of taken images towards the close up end and towards the telephoto end, from this center position. An interval between focus positions may be a predetermined fixed value, and may be a value that is changed in accordance with shooting condition, such as subject distance, focal length, aperture value etc.

It should be noted that if the number of images to be taken is an even number and is not equal at the close end and the far end, the number of images to be taken at the far end may be increased. Also, if the focus reference position is at the infinity end or close to the infinity end, and it is not possible to arrange focus positions evenly, a number of images to be taken at the close-up and may be increased, and conversely if focus reference position is at the close-up end or close to the close-up end and it is not possible to arrange focus positions evenly, the number of images to be taken may be increased at the far end.

Once setting of the focus position has been carried out, next setting of shooting order is carried out (S87). Shooting is preferably sequential shooting in one direction as soon as possible after shooting has been carried out at a previous in-focus position, in order to reduce shooting interval time.

Figure 7:
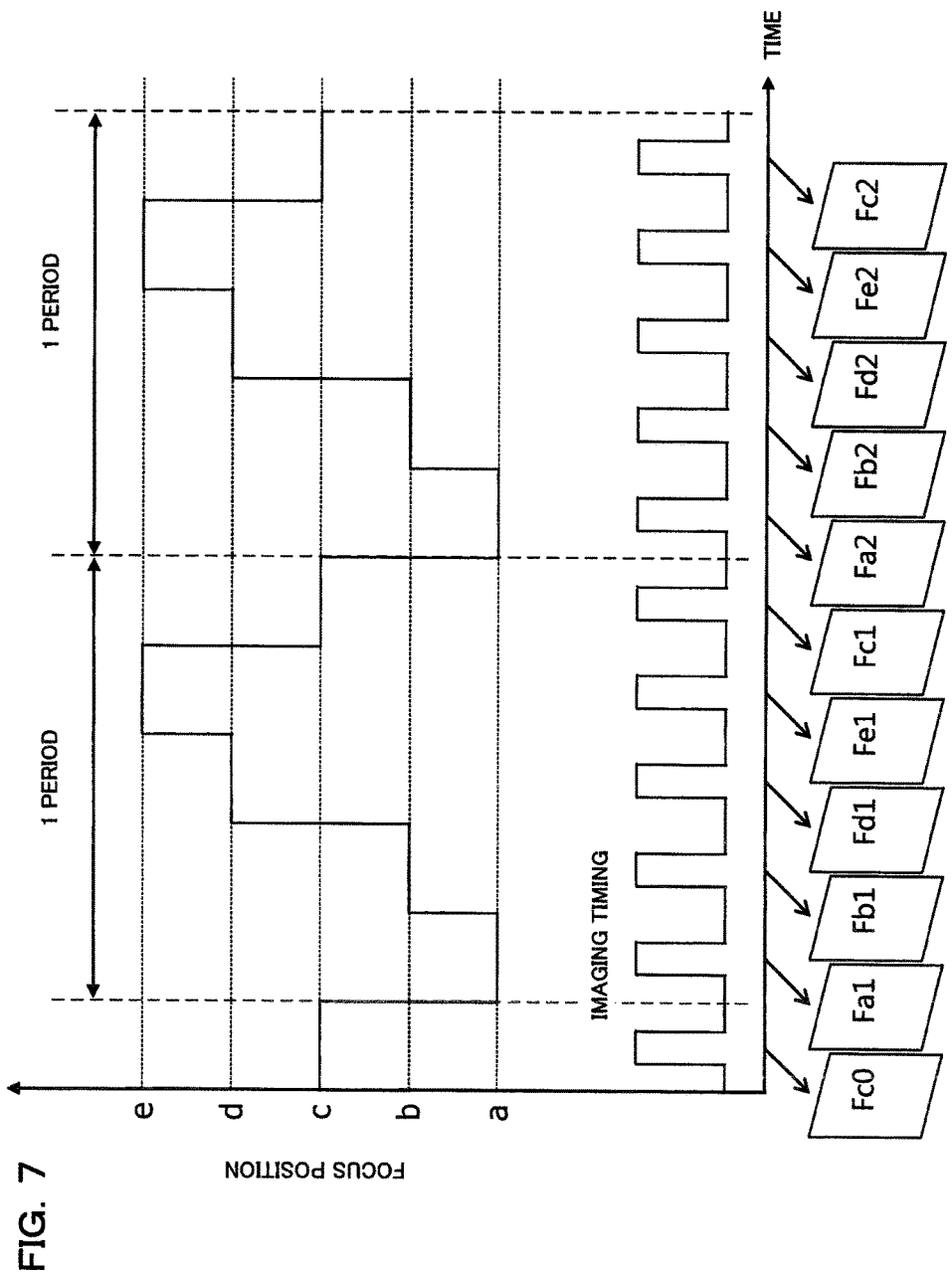
FIG. 7 is a timing chart for a case where focus stacking of the camera of the first embodiment of the present invention is carried out.

Shooting order will be described later using FIG. 7. If setting of shooting order has been carried out, the shooting setting flow is completed and the originating flow is returned to.

Next, before description of the flow for focus stacking, shooting timing and order for focus position and shooting will be described using FIG. 7. In FIG. 7, one period shown on the horizontal axis is a number of times of shooting that has been set in the shooting setting section 117, and with the example shown in FIG. 7 shooting is carried out 5 times in one period. Also, the vertical axis in FIG. 7 represents focus lens position. With the first embodiment, in-focus position of the focus lens is position c, while focus position a is at the close-up end and focus position e is at the infinity end. The focus lens is moved in turn from position a→position b→position d→position e→position c. As was described previously, with this example, at a time of shooting the 0th time in the 0 period, the shooting is carried out at position c, at a time of shooting the 1st time in the 1 period, shooting is carried out at position a, ... and at a time of shooting the 5th time(=0th time), shooting is carried out at position c. Also, image data Fc0, Fa1, Fb1, Fd1, Fe1, Fa2, ... are acquired at the respective focus positions.

Next, detailed operation of the focus stacking in step S77 (refer to FIG. 4) will be described using the flowchart shown in FIG. 6. Once the flow for focus stacking has commenced, first basic image processing is carried out (S91). Here, the basic image processing section 109a subjects the image data from the image sensor 103 to basic image processing. As basic image processing there is OB (optical black) subtraction processing, WB (white balance) correction processing, color matrix computational processing, gamma conversion processing, edge enhancement processing, noise reduction processing etc.

It is next determined whether or not it is the 1st time of shooting (S93). Here, the 1st time is the next time shooting is carried out after the 0th time. Specifically, when the release button has been pressed down half way in step S33, image data is acquired in step S35 and AE and AF are carried out. Shooting at this time is made the 0th time, and next, shooting when image data has been acquired in step S51 is made the 1st time. A shooting interval from the 0th time to the 1st time is determined in accordance with frame rate of the image sensor 103. It should be noted that focus position for shooting the 0th time is equivalent to Fc0 and Fc1 in FIG. 7 and FIG. 8, and focus position for shooting the 1st time is equivalent to Fa1 and Fa2.

If the result of determination in step S93 is the 1st time, alignment 1 is carried out (S95). Since two items of image data are acquired as a result of the shooting the 0th time and the 1st time, in this step alignment is carried out by the image combination section 109b using the two items of image data. In the alignment, image data that has been acquired at a focus position one before, namely with the shooting the 0th time (refer to Fc0 for the shooting the 1st time in FIG. 8), is made a reference for alignment, and position of the image data that has been acquired by shooting the 1st time (refer to Fe1 for the shooting the 1st time in FIG. 8) is aligned.

If alignment 1 has been carried out, next focus stacking 1 for alignment is carried out (S97). In this step, focus stacking is carried out by the image combination section 109b using taken image data after alignment (Fa1 in FIG. 7, Fe1 for 1st time shooting in FIG. 8) and image data that has been taken at a focus position one previously (Fc0 in FIG. 7, Fc0 of the 1st shooting in FIG. 8). Once focus stacking 1 for alignment using a taken image for the 1st shooting has been carried out, the originating flow is returned to.

If the result of determination in step S93 is that it is not the 1st time, it is determined whether or not imaging has been carried out the number of times imaging should be performed (S101). Here it is determined whether or not shooting has been carried out for the number of times of shooting that was set in step S81 (refer to FIG. 5).

If the result of determination in step S101 is that imaging has not been carried out the number of times imaging is to be performed, alignment 2 is carried out (S103). Alignment 2 is the image combination section 109b carrying out alignment with a newest taken image, with the focus stacking image data for alignment that was carried out immediately before as a reference for alignment. For example, in the 2nd time shooting of FIG. 8, alignment with the newest image data Fd1 is carried out with the immediately previous focus stacking image data f0 made a reference for alignment.

Once alignment 2 has been carried out, next focus stacking 2 for alignment is carried out (S105). The image combination section 109b carries out combination processing for focus stacking 2 using taken image data after alignment and immediately previous focus stacking image data for alignment. For example, in the 2nd time shooting of FIG. 8, focus stacking is carried out using immediately previous focus stacking image data f0 and the newest image data Fd1, and focus stacking image data for alignment f1 is generated.

If focus stacking 2 for alignment has been carried out, next focus stacking 1 is carried out (S107). The image combination section 109 carries out combination processing for focus stacking 1 using taken image data after alignment and combined image data that has been generated by the immediately previous focus stacking 1. For example, for the 3rd time shooting in FIG. 8, focus stacking is carried out using taken image data Fb1 after alignment and the immediately previous focus stacking image data F0. In the event that focus stacking has not been carried out immediately previously, an image that was taken at the focus position one before is combined. For example, for the second shooting of FIG. 8, focus stacking is carried out using taken image data after alignment (Fd1) and image data that has been taken at a focus position one before (Fe1). Once focus stacking 1 has been carried out, the originating flow is returned to.

If the result of determination in step S101 is that shooting has been carried out the number of times imaging is to be performed, alignment 3 is carried out (S111). Alignment 3 involves the image combination section 109b carrying out alignment of image data that has been generated by the immediately previous focus stacking 1, with image data that was taken at a focus reference as a reference for alignment. In the 5th time shooting of FIG. 8, alignment of image data (F2) that was generated by the immediately previous focus stacking 1 is carried out with image data (Fc1) that was taken at the focus reference as a reference for alignment.

Once alignment 3 has been carried out, focus stacking 2 is carried out (S113). For focus stacking 2 the image combination section 109b carries out focus stacking using image data of a taken image and focus stacking image data after alignment. For example, in the 5th time shooting of FIG. 8, focus stacking 2 is carried out using image data (Fc1) of a taken image and image data F2 that was generated by the immediately previous focus stacking 1. If the focus stacking 2 of this step S113 has been carried out, the originating flow is returned to. Since shooting has been carried out the number of times shooting is to be formed that has been set (Yes at S79 in FIG. 4), live view display is carried out based on image data that has been generated by the live view focus stacking (refer to S57 in FIG. 3).

In this way, in the flow for focus stacking, alignment of taken images is carried out with a focus stacked image for alignment immediately previously as a reference for alignment, until shooting has been carried out the number of times shooting is to be performed (refer to S103). Focus stacking for alignment is then carried out using a taken image for which this alignment was carried out, and a combined image for alignment immediately prior (refer to step S105). Further, focus stacking is carried out using a taken image for which alignment was carried out in step S103, and a combined image that was generated by the immediately prior focus stacking.

Also, in the flow for focus stacking, if shooting has been carried out up to the number of times that shooting is to be performed, alignment of an image that was generated by the immediately previous focus stacking is carried out with a taken image that was taken at a focus reference position as a reference (refer to S111). Focus stacking is then carried out using a focus stacked image for which this alignment was carried out, and the newest taking image (refer to S113).

In this way, in the flow for focus stacking, focus stacking for alignment is carried out. Since image data of a focus reference position 1 period prior is included in an image that has been generated by the focus stacking for alignment, if the focus stacked image for alignment is used as is in the focus stacking 2, focus reference position will become combined twice. Specifically, in order to avoid focus reference position moving every time focus position is moved, then in focus stacking 1 up until the final focus stacking is carried out, alignment is carried out at the focus reference position where initial shooting took place. With focus stacking 2 in which shooting has been carried out the number of time shooting is to be performed and final focus stacking is carried out, since image data is acquired again at the focus reference position alignment is carried out with this newest taken image as the reference position.

Also, in a case where there is no focus stacking for alignment, it is necessary to carry out initial alignment at focus positions a and b (close-up end). In this case, there is a possibility that required information maybe insufficient, at either focus position a or focus position b, for performing alignment. If there is focus stacking for alignment, since initial alignment is carried out with focus reference position c which is in focus and focus position a for the close-up end, accurate alignment can be carried out. With focus stacking for alignment only, since focus reference position is combined twice there is a possibility that this will affect image quality.

Next, a second embodiment of the present invention will be described using FIG. 9 to FIG. 11. With the first embodiment of the present invention, focus stacking processing for alignment was carried out (refer to S97 and S105 in FIG. 6). Conversely, with this embodiment focus stacking processing for alignment is omitted by moving the focus lens as shown in FIG. 10.

The electrical structure of this embodiment is similar to the block diagram shown in FIG. 1 and so detailed description will be omitted. Also, operation of this embodiment differs from the operation shown in the flowcharts of FIG. 3 to FIG. 6 only in that the flowchart for focus stacking shown in FIG. 6 is replaced by the flowchart shown in FIG. 9, and so description will center on this point of difference First, the order of moving focus position in this embodiment will be described using FIG. 10. With this embodiment, as shown in FIG. 10, for the 0th time of shooting, a focus lens is moved to focus position c, which is an in-focus position, and after that the focus lens is moved in the order position d→position e→position a→position b→position c. With this example, at the time of shooting the 0th time shooting is carried out at position c, at the time of shooting the 1st time shooting is carried out at position d which is close to position c, and by subsequently moving to position e, . . . , at the time of shooting the 5th time(=the 0th time) shooting is carried out at position c. Also, image data Fc0, Fd1, Fd1, Fa1, Fb1, Fc2, . . . are acquired at the respective focus positions.

Next, focus stacking operation of this embodiment will be described using the flowchart shown in FIG. 9. Regarding the flowchart shown in FIG. 9 and the flowchart shown in FIG. 6, the same step numbers are attached to steps that carry out the same processing, and detailed description would be omitted.

Figure 9:
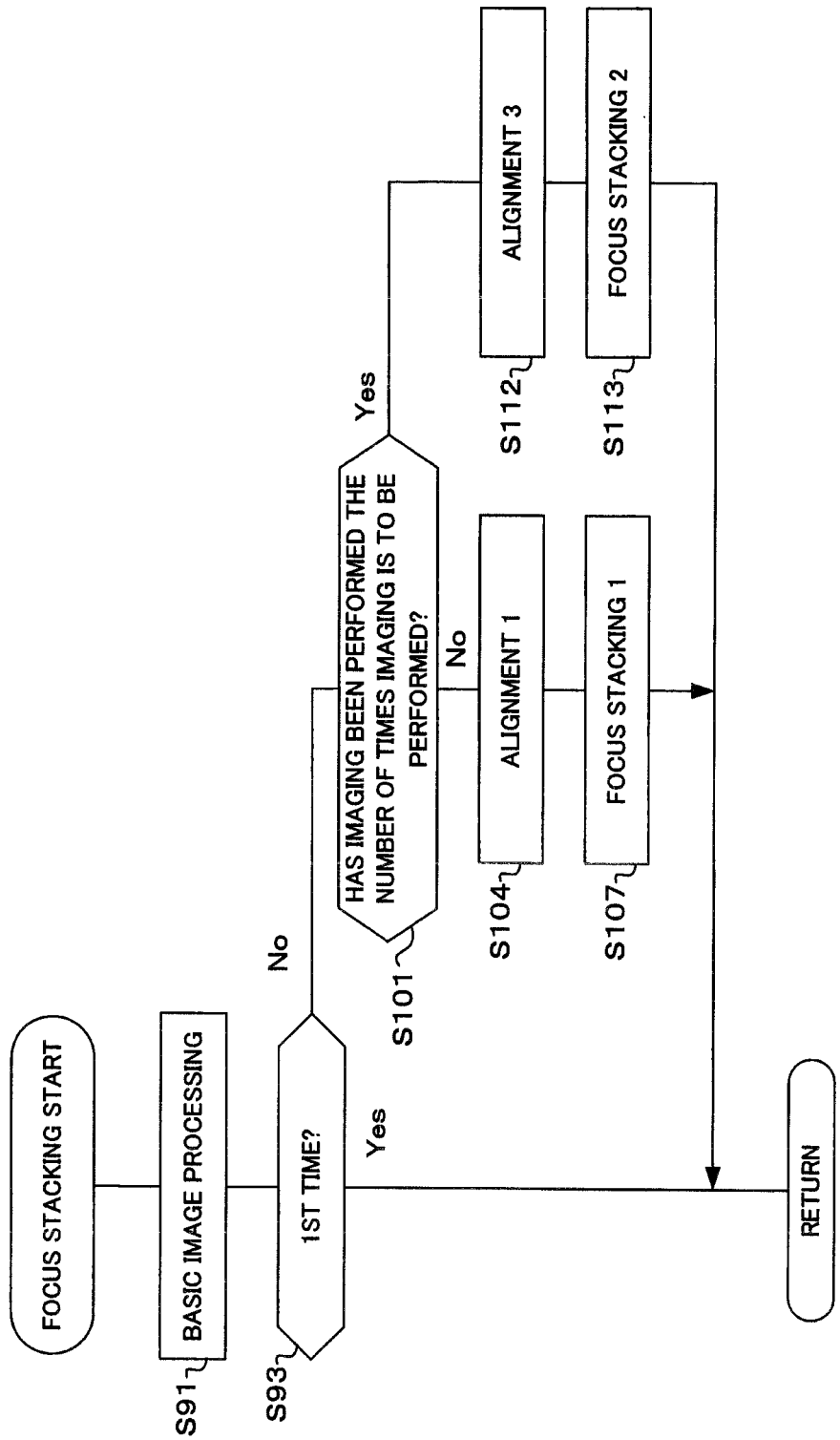
FIG. 9 is a flowchart showing a focus stacking operation of the camera of a second embodiment of the present invention.
Figure 10:
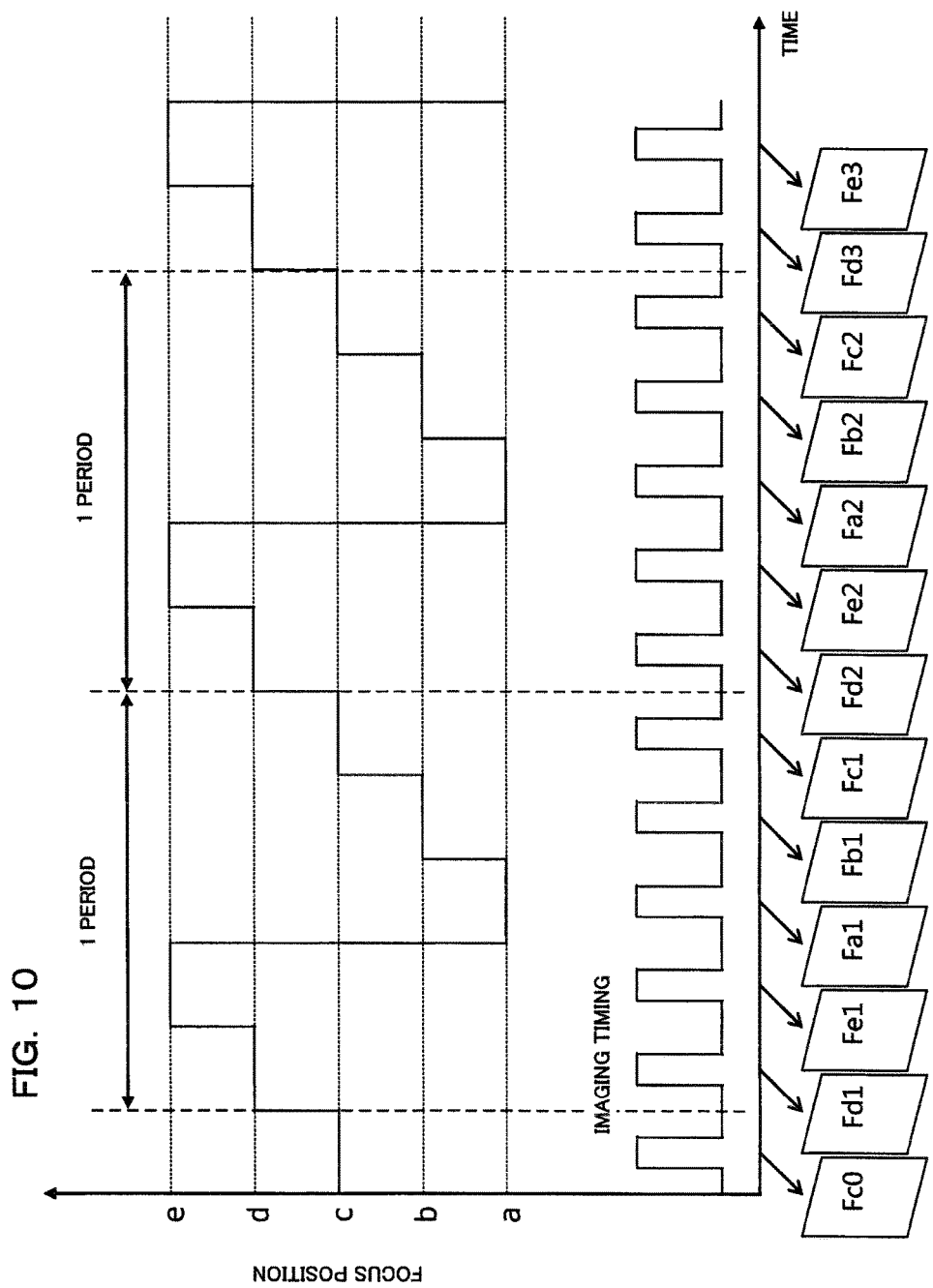
FIG. 10 is a timing chart for a case where focus stacking of the camera of the second embodiment of the present invention is carried out.

If the flow of FIG. 9 is commenced, first basic image processing is carried out (S91), and it is determined whether or not it is 1st time shooting (S93). If the result of this determination is that it is 1st time shooting, the focus stacking is completed and the originating flow is returned to. In the first embodiment, focus stacking for alignment was carried out, but with this embodiment since focus stacking for alignment is not carried out, if it is determined in step S93 that it is the 1st time, the originating flow is returned to without carrying out focus stacking for alignment.

If the result of determination in step S93 is that it is not the 1st time, it is determined whether or not shooting has been carried out the number of times imaging is to be performed (S101). If the result of this determination is that shooting has not been carried out the number of times imaging is to be performed, alignment 1 is carried out (S104). Here, an image taken at the next focus position to the focus reference position(=1st image), or a combined image in a case where focus stacking 1 has been carried out immediately prior, is taken as a reference for alignment of a taken image to be carried out by the image combination section 109b.

With the example shown in FIG. 11, with a 2nd image for which focus stacking 1 has not been carried out immediately prior, alignment of the newest taken image data Fe1 is carried out with image data Fd1 which was combined by focus stacking 1 that was carried out immediately prior as a reference for alignment. Also, with a 3rd image for which focus stacking 1 was carried out immediately prior alignment of the newest taken image data Fa1 is carried out with focus stacking image data F0 as a reference for alignment.

If alignment 1 has been carried out, next focus stacking 1 is carried out (S107). Here, the image combination section 109b combines a taken image after alignment with a combined image that was generated by the immediately prior focus stacking 1. With the example shown in FIG. 8, for the 3rd image, focus stacking is carried out using image data Fa1 of a taken image after alignment and combined image data F0 that was generated by the immediately prior focus stacking 1. Also, in the event that focus stacking 1 has not been carried out immediately prior, an image that was taken at the focus position one before is combined. With the example shown in FIG. 8, for the 2nd image focus stacking is carried out using image data Fd1 that was taken at the focus position one before and the newest image data Fe1. Once focus stacking has been carried out, the originating flow is returned to.

If the result of determination in step S101 is that imaging has been carried out the number of times imaging is to be performed, alignment 3 is carried out (S111). Here, the image combination section 109b carries out alignment of image data that has been generated by the immediately previous focus stacking 1, with taken image data that was taken at a focus reference (position c in FIG. 7) as a reference for alignment. With the example shown in in FIG. 11, alignment of image data F2 that was generated by the immediately previous focus stacking 1 is carried out with image data Fc1 that was acquired by the 5th shooting as a reference for alignment.

If alignment 3 has been carried out, next focus stacking 2 is carried out (S113). Here, the image combination section 109b combines a taken image with a focus stacked image after alignment. With the example shown in FIG. 11, for the 5th shooting, focus stacking is carried out using taken image data Fc1 that has been aligned, and the immediately previous focus stacking image data F2. Once focus stacking 2 has been carried out, the originating flow is returned to, and in step S57 (refer to FIG. 3), the results of focus stacking 2 in step S113 are subjected to live view display.

In this way, with this embodiment alignment is carried out without carrying out focus stacking for alignment, and focus stacking processing is carried out. Specifically, as shown in FIG. 10, movement of the focus position is initially carried out to the focus reference position (position c), and then to position d which is adjacent to the next focus position. As a result, the possibility of being in focus at position d is high and accurate alignment is possible with focus position d that is next to focus position c, being the focus reference position for the previous period, as a reference position for initial alignment 1 (S104). With this embodiment, since focus stacking for alignment is not carried out it is possible to reduce processing load.

With this embodiment, the shooting setting section 117 functions as a focus bracket setting section, and this focus bracket setting section sets a focus position that is adjacent to the final focus position as a position next to the final focus position (refer, for example, to FIG. 10). Also, the microcomputer 121 and the image combination section 109b function collaboratively as a focus stacking control section, but this focus stacking control section does not carry out any alignment using the final focus position and a taken image for the next position to this final focus position (refer, for example, to FIG. 11).

Next, a third embodiment of the present invention will be described using FIG. 12 to FIG. 15. In the first embodiment, a focus position at the time of pressing the release button down half way (1st release) was made a focus reference position. However, there are cases where focus positions other than this focus position are more appropriate as a focus reference position (for example, cases where focus range is wide etc.). With this embodiment, therefore, a focus level value representing size of focus range for respective taken data of a single period (for example, contrast value) is acquired, and at the time of focus reference position setting a focus position where the focus level value is maximum is updated as a focus reference position for the next period. Since it becomes necessary to shoot at the focus reference position that has been updated after shooting for a single period, a number of taken images until display is made the number of images for a single period+1.

The electrical structure of this embodiment is similar to the block diagram shown in FIG. 1 and so detailed description will be omitted. It should be noted that the AF processing section 113 has an AF processing circuit, and this AF processing circuit performs imaging at a plurality of focus position that have been set by the shooting setting section 117, and detects focus level based on the acquired images.

Figure 12:
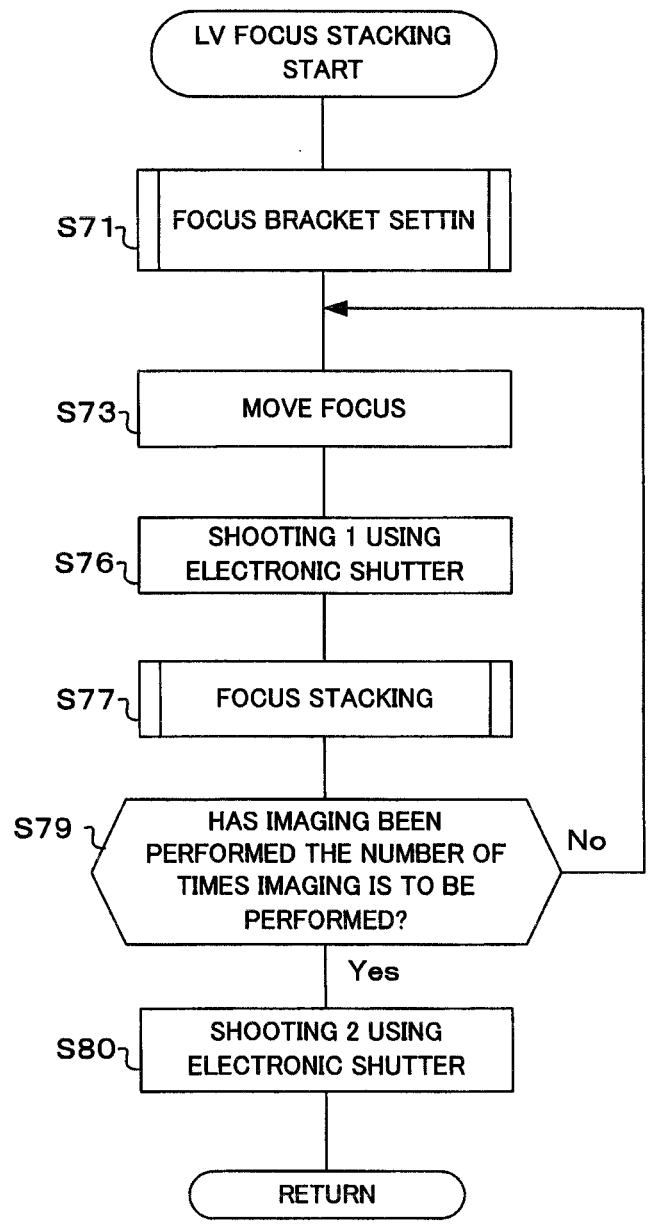
FIG. 12 is a flowchart showing a live view focus stacking operation of the camera of a third embodiment of the present invention.
Figure 13:
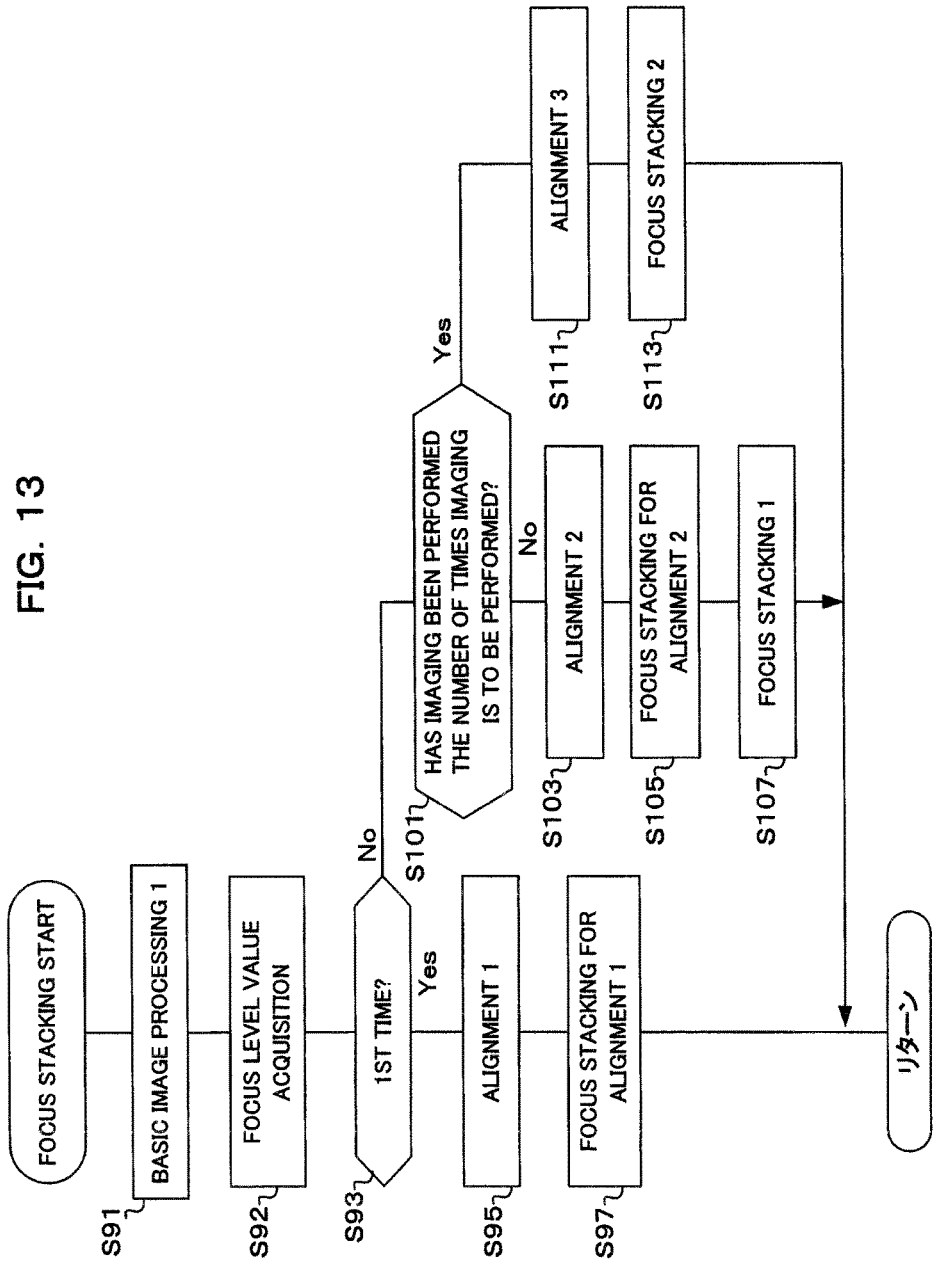
FIG. 13 is a flowchart showing a focus stacking operation of the camera of the third embodiment of the present invention.

Also, operation of this embodiment differs from the operation shown in the flow charts of FIG. 3 to FIG. 6 in that the flowchart for live view focus stacking shown in FIG. 4 is replaced by the flowchart for live view focus stacking shown in FIG. 12, and that the flowchart for focus stacking shown in FIG. 6 is replaced with the flowchart shown in FIG. 13, and so description will center on these points of difference.

Figure 14:
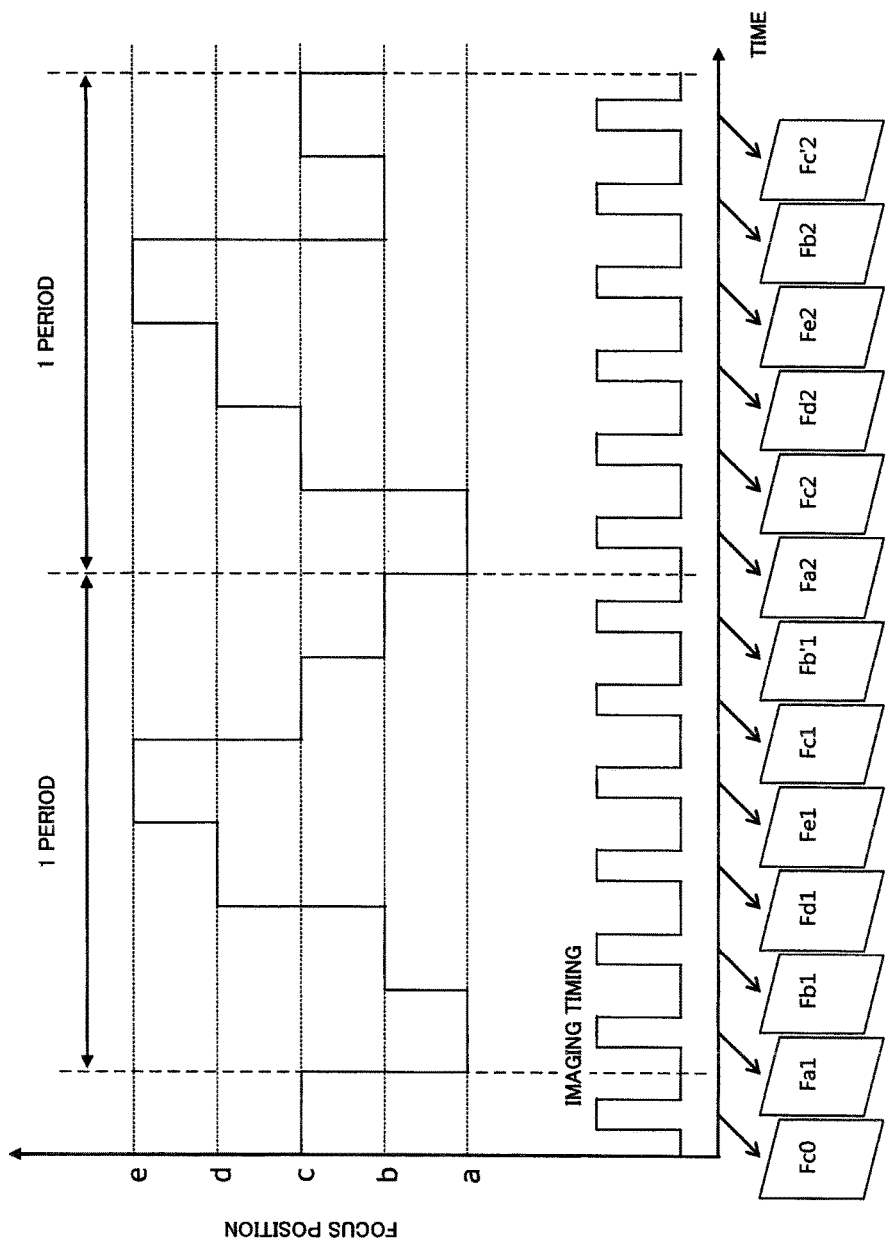
FIG. 14 is a timing chart for a case where focus stacking of the camera of the third embodiment of the present invention is carried out.

First, the order of moving focus position in this embodiment will be described using FIG. 14. With this embodiment, in the initial 1 period, as shown in FIG. 14, for the 0th time of shooting, a focus lens is moved to focus position c, which is an in-focus position, the 1st time of shooting is entered, and after at the focus lens is moved in the order position a→position b→position d→position e→position c. At the conclusion of the 1st time of shooting, during movement from position a to position e, there was movement to a focus position where the focus level value becomes maximum. With the example shown in FIG. 14, the focus lens is moved to position b at the end of the 1 period as a maximum focus level value in the initial 1 period.

In the next 1 period, the focus lens is moved in the order position a→position c→position d→position e→position b. For shooting at the conclusion of this period, during movement from position a to position e, there is movement to a focus position where the focus level value becomes maximum. With the example shown in FIG. 14, a focus position where the focus level value becomes maximum is position c, and the focus lens is moved to position c at the conclusion of the 1 period. Then, at the respective focus positions, in the initial 1 period image data is acquired in the order image data Fc0, Fa1, Fb1, Fd1, Fe1, Fc1 and Fd1. Also in the next 1 period image data is acquired in the order image data Fa2, Fc2, Fd2, Fe2, Fb2, Fc2.

Next, operation of the live view focus stacking will be described using the flowchart shown in FIG. 12. From step S71 until S79 is similar to the flowchart shown in FIG. 4, and so detailed description has been omitted.

The live view focus stacking flow is entered and if the result of determination instep S79 is that shooting has been carried out the number of times imaging is to be performed, next shooting 2 is carried out using the electronic shutter (S80). As will be described later, a focus level value is calculated at each focus lens position. In this step, the focus lens is moved to a focus position corresponding to a maximum focus level value, among these calculated focus level values, and at this position shooting is carried out using the electronic shutter and image data is acquired. The image data that has been acquired here is used at the time of the alignment in step S111 (refer to FIG. 13).

Next, operation of the focus stacking in step S77 (refer to FIG. 12) will be described using the flowchart shown in FIG. 13. Regarding the flowchart shown in FIG. 13 and the flowchart shown in FIG. 6, the same step numbers are attached to steps that carry out the same processing, and detailed description will be omitted.

If the flow shown in FIG. 13 is entered and basic image processing 1 is carried out (S91), a focus level value is acquired (S92). Here, the AF processing section 113 calculates focus level value using image data that has been acquired for each focus position. The calculated focus level values are stored in memory in correlation with focus position.

Once the focus level values have been acquired, it is next determined whether or not it is 1st time shooting (S93). This determination is based on whether or not it is a focus position next to a focus position at the time the release button has been pressed down half way (1st release) for the 1st period.

If the result of determination in step S93 is the 1st time shooting, alignment 1 is carried out (S95). Here, the image combination section 109b carries out alignment for taken image data with image data that has been taken at a focus position one before as a reference for alignment. For example, with the example shown in FIG. 15, alignment is carried out for newest image data (1st time shooting) Fa1, with image data Fc0 that has been taken at the previous in-focus position as a reference.

If alignment 1 has been carried out, next focus stacking 1 for alignment is carried out (S97). Here, the image combination section 109b performs focus stacking of taken images after alignment and images taken at a focus position one before. With the example shown in FIG. 15, focus stacking processing is carried out using image data Fa1 that has been aligned, and image data Fc0 of the previous shooting. Once focus stacking 1 for alignment using a taken image for the 1st shooting, the originating flow is returned to.

If the result of determination in step S93 is that it is not the first time, it is determined whether or not imaging has been carried out the number of times imaging is to be performed (S101). If the result of this determination is that imaging has not been carried out the number of times imaging is to be performed, alignment 2 is carried out (S103). Here, the image combination section 109b carries out alignment of taken images using a focus stacked image for alignment that was carried out immediately prior as a reference for alignment. With the example shown in FIG. 15, in the 2nd time of shooting alignment is carried out for taken image data Fb1 with focus stacking image data for alignment f0 as a reference.

Once alignment 2 has been carried out, next focus stacking 2 for alignment is carried out (S105). Here, the image combination section 109b combines taken images after alignment with focus stacked images for alignment immediately prior. With the example shown in FIG. 15, for the 2nd time of shooting focus stacking processing is carried out using focus stacking image data for alignment f0 and taken image data Fb1.

If focus stacking 2 for alignment has been carried out, next focus stacking 1 is carried out (S107). Here, the image combination section 109b combines a taken image after alignment with a combined image that was generated by the immediately prior focus stacking 1. For example, with the example shown in FIG. 15, focus stacking processing is carried out using focus stacking image data F0 and taken image data after alignment Fd1. Also, in the event that focus stacking 1 has not been carried out immediately prior, an image that was taken at the focus position one before is combined. For example, with the example shown in FIG. 15, for the 2nd time of shooting, focus stacking processing is carried out using focus stacking image data for alignment f0 and taken image data Fb1. Once focus stacking 1 has been carried out, the originating flow is returned to.

If the result of determination in step S101 is that imaging has been carried out the number of times imaging is to be performed, alignment 3 is carried out (S111). Here, the image combination section 109b carries out alignment of image data that has been generated by the immediately previous focus stacking 1, with a taken image (focus reference position) as a reference for alignment. For example, with the example shown in FIG. 15, alignment of image data (F2) that was generated by the immediately previous focus stacking 1 is carried out with taken image data (focus reference position) Fc1 for the 5th shooting of 1 period as a reference for alignment.

If alignment 3 has been carried out, next focus stacking 2 is carried out (S113). Here, the image combination section 109b combines a taken image with a focus stacked image after alignment. With the example shown in FIG. 15, focus stacking processing is carried out using taken image data Fc1 that has been aligned, and the immediately previous focus stacking image data F2.

Once focus stacking 2 has been carried out in step S113, the originating flow is returned to, and live view display is carried out in step S57. It should be noted that next, in the event that live view focus stacking is carried out, taken image data that was taken in a focused state that was acquired in step S80 is used as image data for alignment. This means that in the next period also, since alignment is carried out with an in focus image as a reference, it is possible to carry out high precision alignment.

In this way, with the third embodiment of the present invention, focus level is detected, and at the conclusion of 1 period a focus lens is moved to a focus position where the focus level is highest. As a result, even if live view focus stacking it is repeated it is possible to carry out alignment of an image that is always in focus to a reference, and it is possible to obtain a focus stacked image with a reduced sense of incongruity.

The AF processing section 113 of this embodiment functions as a focus level detection circuit that performs imaging at a plurality of focus positions that have been set by the focus bracket setting section, and detects focus level based on the acquired images. The shooting setting section 117 also functions as a focus bracket section, and this focus bracket section sets a final focus position of the focusing lens to a focus position where focus level that has been detected by the focus level detection section is high (refer, for example, to S80 in FIG. 12, and to FIG. 14).

Next, a fourth embodiment of the present invention will be described using FIG. 16 to FIG. 18. With the first to third embodiments, in a case where shooting was performed at a focus position that had been set in focus bracket setting instep S71, there were cases where there was not a subject focus range, but in this case also, focus stacking was carried out. Conversely, with the fourth embodiment, in the event that there is no focus range focus stacking is not carried out.

The electrical structure of this embodiment is similar to the block diagram shown in FIG. 1 and so detailed description will be omitted. Also, operation of this embodiment differs from the operation shown in the flow charts of FIG. 3 to FIG. 6 in that the flowchart for focus stacking shown in FIG. 6 is replaced by the flowchart shown in FIG. 16, and so description will center on this point of difference.

First, the order of moving focus position will be described using FIG. 17. With this embodiment, as shown in FIG. 14, in the initial 0th period, for the 0th time of shooting, a focus lens is moved to focus position c, which is an in-focus position, the next 1 period of shooting is entered, and after that the focus lens is moved in the order position a→position b→position d→position e→position c.

Also, in the first period, the focus lens is moved (refer to S73 in FIG. 4), shooting is carried out using the electronic shutter (refer to S75 in FIG. 4), and the AF processing section 113 calculates AF level using image data that has been acquired at this time. The AF level that has been calculated is stored in correspondence with focus position, and in accordance with this storage, at the time of focus bracket setting for the next period (S71 in FIG. 4) focus stacking processing is not carried out at a focus position that is outside a focus range based on AF level.

Figure 17:
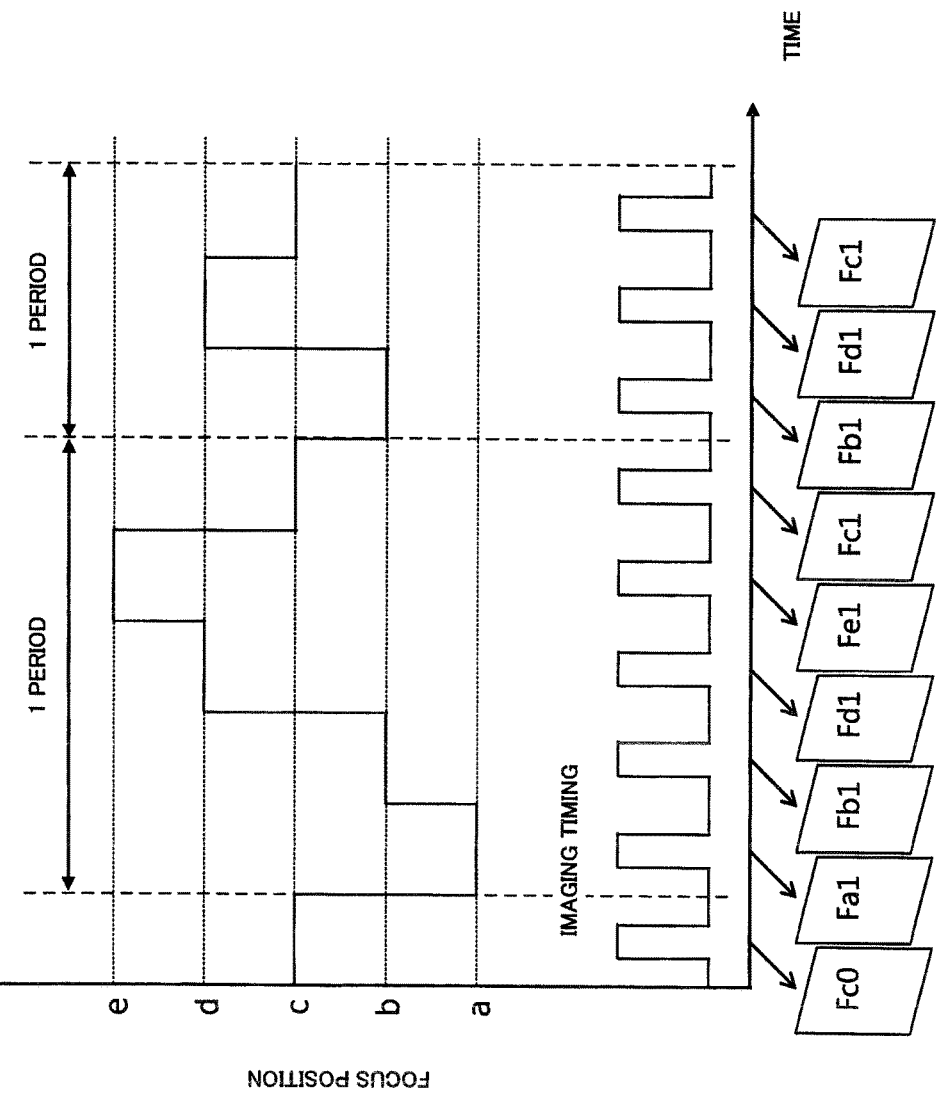
FIG. 17 is a timing chart for a case where focus stacking of the camera of the fourth embodiment of the present invention is carried out.

With the example shown in FIG. 17, for focus lens position a and position e, a result of AF level calculation for the previous 1 period is that they are not contained within a focus range. Therefore, in the next 1 period image processing for focus stacking is not carried out at positions a and e. Accordingly, the focus lens is moved in turn from position b→position d→position c.

Next, operation of the focus stacking in step S77 (refer to FIG. 4) will be described using the flowchart shown in FIG. 16. Regarding the flowchart shown in FIG. 16 and the flowchart shown in FIG. 6, the same step numbers are attached to steps that carry out the same processing, and detailed description will be omitted.

Figure 16:
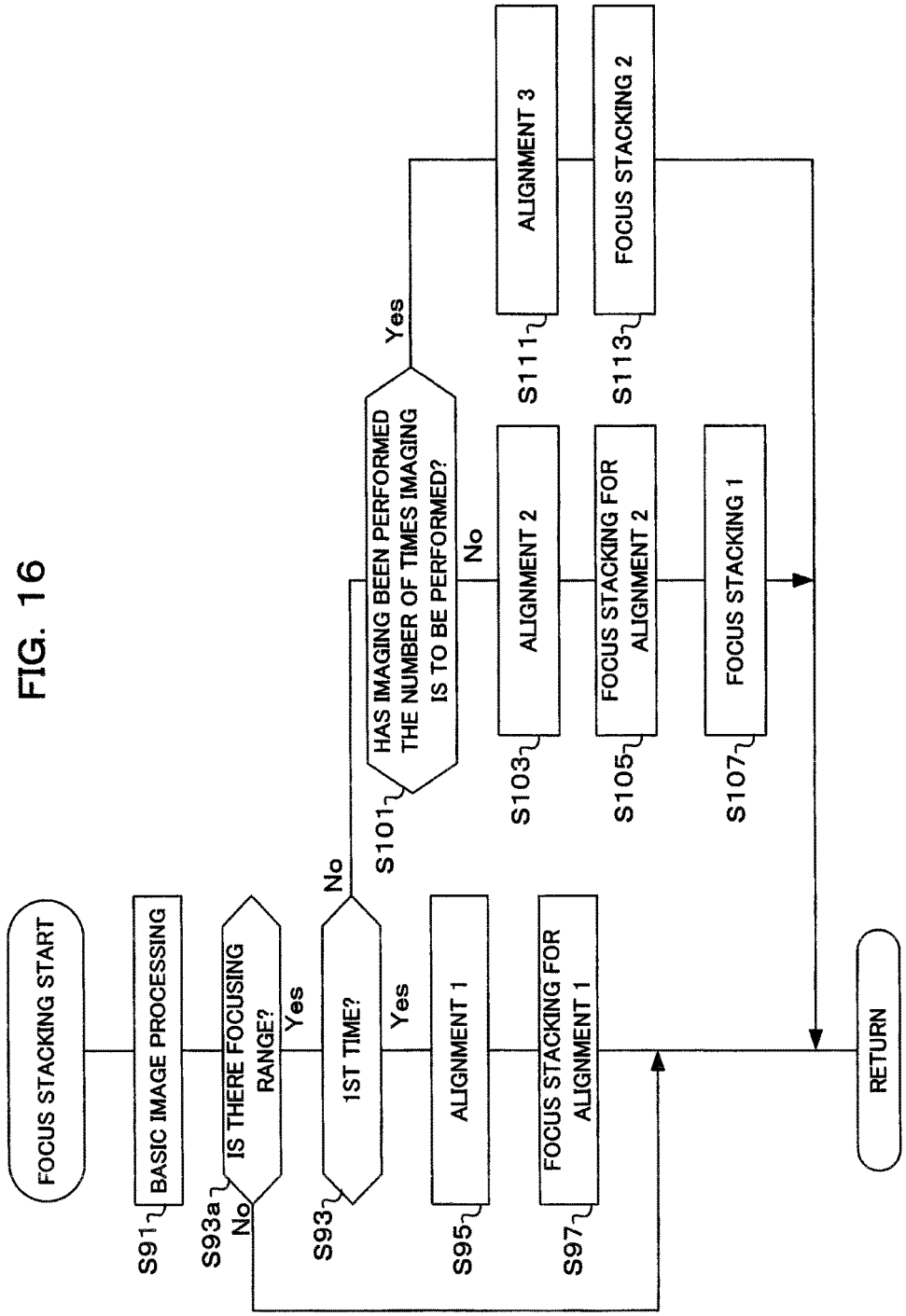
FIG. 16 is a flowchart showing a focus stacking operation of a camera of a fourth embodiment of the present invention.

If the flow shown in FIG. 16 is entered and basic image processing 1 is carried out (S91), it is determined whether or not there is a focus range (S93$a$). Here, in the focus bracket setting, if a result of AF level calculation for the previous 1 period is within a focus range, it is taken as a focus position to be set. In this step, it is determined whether or not an AF level is within a focus range in accordance with results that have been set by the focus bracket setting. Also, with the basic image processing 1 of step S91, the AF processing section 113 calculates AF level using image data for carrying out basic image processing 1, and this AF level is compared with a threshold value to determine whether or not the AF level is within a focusing range. Focus position and determination result are correlated and stored in memory, and if generation of a focus stacked image for one period is completed the focus position and determination result are used in focus bracket setting (S71 in FIG. 4).

If the result of determination in step S93$a$ is that the AF level is within the focusing range, generation of focus stacking image data is carried out by executing steps S93 onwards. Steps S93 and onwards are the same processing as in the flowchart of FIG. 6, and so detailed description is omitted.

On the other hand if the result of determination in step S92$a$ is that the AF level is outside the focusing range, the flow for focus stacking is terminated and the originating flow is returned to. Specifically, generation of focus stacking image data is not carried out for this focus position.

FIG. 18 shows taken images, reference images for alignment, focus stacked images for alignment and focus stacked images, for each shooting time. With the example shown in FIG. 18, in the first period, for each focus position of the 1st to 5th times, focus stacking image data is generated, and focus stacking image data is generated for focus positions b, d and c of the next one period.

In this way, with this embodiment, in the event that AF level is not within a focusing range, a focus stacked image is not generated (refer to S93$a$ No in FIG. 16). Specifically, the focus bracket setting section calculates AF level for the previous 1 period, and sets focus positions where focus stacking will be carried out based on the result of this calculation. This means that it is possible to optimize shooting/number of combinations in accordance with whether or not AF levels are within a focusing range, and it is possible to reduce processing load while improving frame rate or maintaining the frame rate.

It should be noted that with this embodiment, in the event that a result of AF level calculation is at the close up or infinity end a focusing range extends over a wide range, and a deeper depth of field may be obtained by increasing the number of focus positions where shooting is performed. Also a contrast evaluation value is calculated and this contrast evaluation value is used as AF level, but this is not limiting, and, for example, defocus amount at the time of phase difference AF may also be used as an AF level (the same as in a modified example of the fourth embodiment, which will be described later).

Next a modified example of the fourth embodiment will be described using FIG. 19 and FIG. 20. With the fourth embodiment, at the time of focus stacking for the previous 1 period, AF level is calculated, setting of focus bracket is changed based on the result of this calculation, and it is determined whether or not focus stacking will be carried out in accordance with AF level at the time of focus stacking for the next 1 period. However, with this modified example at the time of carrying out basic image processing (S91 in FIG. 16), detection of AF level is also carried out, and whether or not to carry out image processing for focus stacking is determined based on this AF level detection result.

Figure 19:
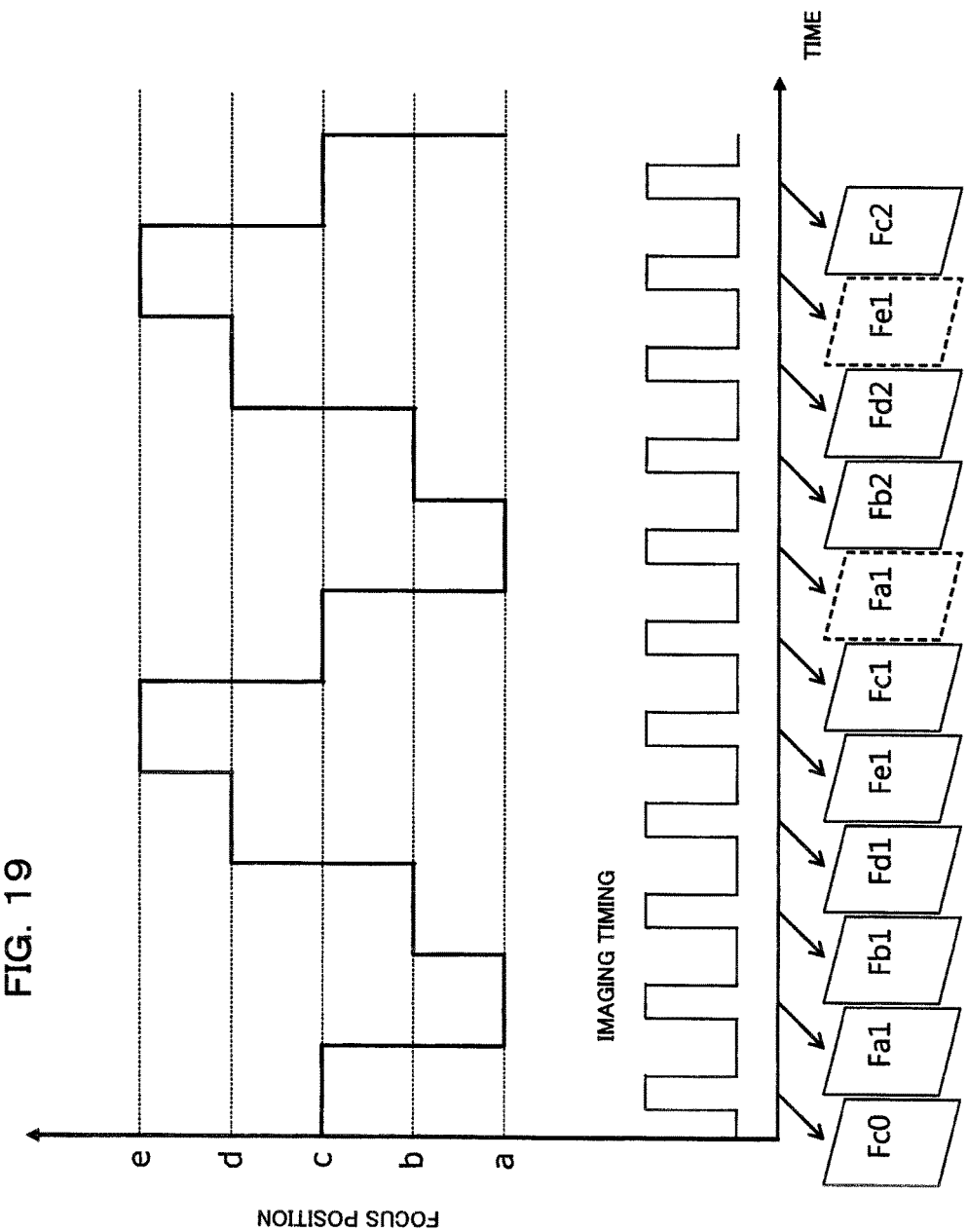
FIG. 19 is a timing chart for a case where focus stacking of a camera of a modified example of the fourth embodiment of the present invention is carried out.

FIG. 19 shows an example of focus position control. As will be understood from FIG. 19, in this modified example the focus lens is moved in the order of position c→position a→position b→position d→position e→position c→position a→position b→position d→position e→position c→, namely moved sequentially through all focus positions. Image data (Fc0, Fa1, Fb1, . . . ) is then acquired at the respective focus positions. In this way, image data is acquired at all focus positions, but for image data Fa1 and Fe1 for which AF level is low and not within the focusing range, focus stacking processing is not carried out even if image data is acquired.

FIG. 20 shows a relationship between period, number of taken images, taken images, reference images for alignment, focus stacked images for alignment and focus stacked images in this modified example. In FIG. 20, for the 1st shooting of the 2 period, a taken image Fa2 is acquired, but AF level of this taken image Fa2 is low, which means that it is not used in image processing for focus stacking (including alignment). A second taken image Fb2, 3rd taken image Fd2 and 5th taken image Fc2 have AF level that is within the focusing range, and so are used in image processing (including alignment) for focus stacking.

In this way, with this modified example, before focus stacking processing AF level is determined, and whether or not to carryout focus stacking processing is determined based on this result. Specifically, with this modified example, the focus stacking control section does not generate a focus stacked image if AF level is not within a focusing range. As a result, even if subject AF level fluctuates, unnecessary focus stacking processing not being carried out is rapidly handled.

As has been described above, with each of the embodiments and the modified example of the present invention, image combination is performed of an image that has been taken at a final focus position with a previously taken image or a previously combined image, with position of this finally taken image as a reference for alignment at the time of image combination (refer, for example, to the first shooting of the first cycle in FIG. 8), and on the other hand image combination is performed for taken images other than an image that has been taken at the final focus position with a previously taken image or an image that was previously combined, as the reference for alignment (refer, for example to the 2nd time-5th time in the 1 period of FIG. 8).

Specifically, at the time of focus stacking using a plurality of images, in contrast to carrying out alignment using a previously taken image or the like in the case of other than the final taken image, in the case of the final taken image, alignment is carried out using that final taken image. This means that it is possible to carry out focus stacking processing appropriately even if the subject or imaging apparatus has moved. In a case where the subject has moved, or if the imaging apparatus moves, subject position changes within shooting angle of view, but with this embodiment a final focus stacked image is generated based on a result of final imaging. When generating an interim image for focus stacking, this interim image is not reflected in a final image, and so there is no problem even if a previously taken image is used.

It should be noted that in each of the embodiments and the modified example of the present invention, the shooting state estimation section 115, shooting setting section 117, focus reference position setting section 119, image processing section 109, AE processing section 111 and AF processing section 113 are configured separately to the microcomputer 121, but as well as being constituted by hardware circuits and simple devices they may be configured integrally with the microcomputer 121, and may also be configured as software using a separate CPU and programs. It is also possible for these sections to have a hardware structure such as gate circuits generated based on a programming language that is described using Verilog, and also to use a hardware structure that utilizes software such as a DSP (digital signal processor). Suitable combinations of these approaches may also be used.

Also, with each of the embodiments of the modified example of the present invention, a camera also carries out image processing for focus stacking, but only shooting for focus stacking may be carried out, and it is also possible for image processing for focus stacking to be carried out by an apparatus for image processing, such as a personal computer or smart phone etc.

Also, with each of the embodiments and the modified example of the present invention, an instrument for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal, personal computer (PC), tablet type computer, game console etc., or a camera for a scientific instrument such as a microscope, a camera for mounting on a vehicle, a surveillance camera etc. The present invention can be applied to any of the implementations, providing it is a device for taking pictures that adopts different optical systems.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging apparatus, comprising:
an imaging lens for forming a subject image on an imaging surface,
an image sensor, positioned on the imaging surface, for capturing the subject image and acquiring image data,
a processor having a focus bracket setting section, a focus stacking control section and a live view control section,
the focus bracket setting section carrying out setting of a number of times of imaging and focus position setting on the imaging surface in accordance with the number of times of imaging is carried out,
the focus stacking control section performing imaging at a plurality of focus positions that have been set by the focus bracket setting section, carrying out successive image combination for each imaging, and, after imaging for the number of times imaging is carried out that has been set by the focus bracket setting section, generating a focus stacking image, and
a display device for displaying a focus stacked image that has been generated by the focus stacking control section, the display device including a display panel and a display driver, wherein
the live view control section repeatedly carries out a series of processing for setting of focus positions using the focus bracket setting, generation of the focus stacked image by the focus stacking control section, and display of the focus stacked image by the display device, and
the focus stacking control section, performs image combination of an image that has been taken at the final focus position with a previously taken image or a previously combined image, with position of the finally taken image as a reference for alignment at the time of image combination, and on the other hand performs image combination of taken images other than an image that has been taken at the final focus position with a previously taken image or an image that was previously combined, as the reference for alignment.

2. The imaging apparatus of claim 1, wherein:
the focus bracket setting section sets a final focus position on the imaging surface as a commencement position for focusing of autofocus.

3. The imaging apparatus of claim 1, wherein:
the focus stacking control section
makes a taken image at the final focus position a reference, and carries out alignment of a taken image at the next position to this final focus position, and
carries out focus stacking for alignment using a taken image for which this alignment has been carried out, and a taken image at the next position to the final focus position, and generates a focus stacked image for alignment.

4. The imaging apparatus of claim 3, wherein:
the focus stacking control section
makes the focus stacked image for alignment a reference and carries out alignment of the newest taken image, and
carries out focus stacking using a taken image that has been subjected to this alignment, and this focus stacked image for alignment.

5. The imaging apparatus of claim 1, wherein:
the focus stacking control section
makes a taken image at the final focus position a reference, and carries out the alignment of the focus stacked image that was generated immediately prior to the final focus position, and
generates a final focus stacked image using the focus stacked image that has been subjected to this alignment and the taken image at the final focus position.

6. The imaging apparatus of claim 1, wherein:
the focus bracket setting section sets a position that is next to the final focus position to a focus position that is adjacent to the final focus position, and
the focus stacking control section carries out alignment using the final focus position and a taken image at a position next to this final focus position.

7. The imaging apparatus of claim 1, further comprising:
a focus level detection circuit that performs imaging at a plurality of focus positions that have been set by the focus bracket setting section, and detects focus level based on the images that have been acquired, wherein,
the focus bracket setting section sets a final focus position on the imaging surface to a focus position at which focus level that has been detected by the focus level detection section is high.

8. The imaging apparatus of claim 1, further comprising:
an AF processing circuit that calculates AF level representing focus state based on the image data, and wherein
the focus bracket setting section calculates AF level for a previous 1 period, and sets focus positions where focus stacking will be carried out based on the result of this calculation.

9. The imaging apparatus of claim 1, further comprising:
an AF processing circuit that calculates AF level representing focus state based on the image data, and wherein
the focus stacking control section does not generate a focus stacked image in the event that the AF level is not within a focusing range.

10. An image compositing method for an imaging apparatus, the imaging apparatus comprising: an imaging lens for forming a subject image on an imaging surface, and an image sensor, positioned on the imaging surface, for capturing the subject image and acquiring image data, the image compositing method comprising:
carrying out setting of a number of times of imaging and focus position setting on the imaging surface in accordance with the number of times of imaging is carried out,
carrying out imaging at the plurality of focus positions that have been set, carrying out successive image combination for each imaging, and generate a focus stacked image after imaging the plurality of times that has been set,
displaying the focus stacked image,
repeatedly carrying out a series of processing to set the plurality of focus positions, generate the focus stacked image and display the focus stacked image,
performing image combination of an image that has been taken at the final focus position with a previously taken image or a previously combined image, with position of the finally taken image as a reference for alignment at the time of image combination,
while on the other hand performing image combination of taken images other than an image that has been taken at the final focus position with a previously taken image or an image that was previously combined, as the reference for alignment.

11. A non-transitory computer-readable medium storing a processor executable code, for controlling an imaging apparatus, this imaging apparatus comprising an imaging lens for forming a subject image on an imaging surface, and an image sensor, positioned on the imaging surface, for capturing the subject image and acquiring image data, the processor executable code performs an image compositing method, the image compositing method comprising:
carrying out setting of a number of times of imaging and focus position setting on the imaging surface in accordance with the number of times of imaging is carried out,
carry out imaging at the plurality of focus positions that have been set, carrying out successive image combination for each imaging, and generate a focus stacked image after imaging the plurality of times that has been set,
display the focus stacked image that has been generated,
repeatedly carry out a series of processing to set the plurality of focus positions, generate the focus stacked image and display the focus stacked image, and
perform image combination of an image that has been taken at the final focus position with a previously taken image or a previously combined image, with position of the finally taken image as a reference for alignment at the time of image combination,
while on the other hand perform image combination of taken images other than an image that has been taken at the final focus position with a previously taken image or an image that was previously combined, as the reference for alignment.

* * * * *